(12) United States Patent
Al-Garadi et al.

(10) Patent No.: US 11,131,186 B1
(45) Date of Patent: Sep. 28, 2021

(54) METHOD FOR DETERMINING WETTABILITY INDEX OF ROCK FROM $T_2$ NMR MEASUREMENTS

(71) Applicant: KING FAHD UNIVERSITY OF PETROLEUM AND MINERALS, Dhahran (SA)

(72) Inventors: Karem Al-Garadi, Dhahran (SA); Ammar El-Husseiny, Dhahran (SA); Mohamed Mahmoud, Dhahran (SA); Mahmoud Elsayed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/808,833

(22) Filed: Mar. 4, 2020

(51) Int. Cl.
*E21B 49/00* (2006.01)
*E21B 49/02* (2006.01)
*G01V 3/14* (2006.01)
*G01V 3/02* (2006.01)

(52) U.S. Cl.
CPC ............ *E21B 49/008* (2013.01); *E21B 49/02* (2013.01); *G01V 3/02* (2013.01); *G01V 3/14* (2013.01)

(58) Field of Classification Search
CPC ......... E21B 49/008; E21B 49/02; G01V 3/14; G01V 3/02
USPC ...................................... 324/303; 166/250.01
See application file for complete search history.

(56) References Cited

U.S. PATENT DOCUMENTS

| 6,765,380 B2 | 7/2004 | Freedman et al. |
| 9,405,037 B2 | 8/2016 | Al-Muthana et al. |
| 9,575,203 B2 * | 2/2017 | Chen ....................... G01V 3/32 |

FOREIGN PATENT DOCUMENTS

| CN | 108020488 B | 11/2019 |
| WO | WO 2019/199304 A1 | 10/2019 |

OTHER PUBLICATIONS

J. Chen, et al., "NMR wettability indices: Effect of OBM on wettability and NMR responses", Journal of Petroleum Science and Engineering, vol. 52, Issues 1-7, Jun. 2006, pp. 161-171.

(Continued)

*Primary Examiner* — Farhana A Hoque
(74) *Attorney, Agent, or Firm* — Oblon, McClelland, Maier & Neustadt, L.L.P.

(57) ABSTRACT

A method for rapid wettability evaluation during exploratory drilling of a hydrocarbon. The method include pre-saturation of the sample by a brine, measuring the bulk brine's $T_2$ NMR relaxation parameter, expelling the brine by oil in the sample, measuring the oil's bulk and pore $T_2$ NMR relaxation parameter, measuring the brine's non-reducible content and $T_2$ NMR relaxation parameter of water in the presence of dominant oil content, expelling the oil by the brine and measuring the $T_2$ NMR relaxation parameter of the irreducible oil content in the dominant brine. The measurements are combined in the index:

$I=[(T_{2WB}-T_{2WIOIRR})/T_{2WB}]-[(T_{2OB}-T_{2OIWIRR})/T_{2OB}]$, where WB is water bulk, OB is oil bulk, WIOIRR—injected pore water at the irreducible oil content, OIWIRR—injected pore oil at the irreducible water content.

8 Claims, 40 Drawing Sheets

(56) References Cited

OTHER PUBLICATIONS

S.H. Al-Mahrooqi, et al., "An investigation of the effect of wettability on NMR characteristics of sandstone rock and fluid systems", Journal of Petroleum Science and Engineering, vol. 39, Issues 3-4, Sep. 2003, pp. 389-398.

M.J. Dick, et al. "Spatially Resolved Wettability Measurements Using NMR Wettability Index", The International Symposium of the Society of Core Analysts (SCA), vol. 89, Aug. 27-30, 2018, pp. 1-12.

Igor Shikhov, et al., "Application of low-field, $^1H/^{13}C$ high-field solution and solid state NMR for characterisation of oil fractions responsible for wettability change in sandstones", Magnetic Resonance Imaging, vol. 56, Oct. 5, 2018, pp. 77-85.

\* cited by examiner

| Material | T1 (msec) | T2 (msec) |
|---|---|---|
| Free water | 4000 | 2000 |
| Hydrocarbons | 250 | 70 |
| Water ice | 5000 | 0.001 |

1. Rock samples were fully saturated with 8% NaCl brine

2. $T_2$ measurements were conducted on fully brine saturated samples ($S_w = 1$) and bulk fluids 3. Oil was injected into the samples until irreducible water saturation $S_{wr}$ was achieved (primary drainage) using URC-628 Ultra Rock Centrifuge 4. $T_2$ measurements were conducted at $S_{wr}$ before aging 5. Indiana samples were aged at 500 psi and 90 °C for one week to restore wettability towards a more oil-wet condition. Berea sandstone were not aged to ensure that they are water wet as known from other studies 6. $T_2$ measurements were conducted at $S_{wr}$ after aging on indiana samples 7. Brine was injected into the samples until residual oil saturation $S_{or}$ was achieved (imbibition)

8. $T_2$ measurements were conducted at $S_{or}$

9. Amott-Harvey indexes were obtained to validate NMR results.

FIG. 18

METHOD FOR DETERMINING WETTABILITY INDEX OF ROCK FROM $T_2$ NMR MEASUREMENTS

BACKGROUND OF THE INVENTION

Technical Field

The present disclosure relates to a method, system and apparatus for determining the wettability index of a hydrocarbon-bearing rock from $T_2$ NMR measurements.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Wetting forces influence hydrocarbon reservoir behavior in many ways, including saturation. Wetting forces also influence measurements of multiphase flow and log interpretation parameters of hydrocarbon reservoirs. Wettability describes the preference of a solid to be in contact with one fluid in comparison to another. A drop of a preferentially wetting fluid displaces another fluid; at the extreme the wetting fluid spreads over the entire surface. Conversely, if a nonwetting fluid is dropped onto a surface already covered by the wetting fluid, it beads up, minimizing its contact with the solid. If the condition is neither strongly water-wetting nor strongly oil-wetting, the balance of forces in the oil/water/solid system results in a contact angle, θ, between the fluids at the solid surface. In a homogeneous, porous material saturated with oil and water, "strongly water-wetting" describes one end member of a continuum in which the surface strongly prefers contact with water. A strongly oil-wetting surface prefers contact with oil. Degrees of wetting apply along the continuum, and if the solid does not have a marked preference for one fluid over the other, its condition is termed intermediate wetting or neutral wetting. The saturation history of the material may influence surface wetting, such that pore surfaces that had been previously contacted by oil may be oil-wet, but those never contacted by oil may be water-wet.

A water-wet rock can be cleaned, dried and fully saturated with a hydrocarbon such as an alkane, while the surfaces in the pores remain water-wet. An oil-saturated but water-wet rock placed into a beaker of water spontaneously imbibes (e.g., absorbs) a significant quantity of water and expels oil. Strictly speaking, the term imbibition refers to an increase in the saturation (volume presence) of the wetting phase, whether this is a spontaneous imbibition process or a forced imbibition process such as a waterflood in a water-wet material. Conversely, drainage refers to an increase in the saturation of the nonwetting phase.

The original wettability of a formation and the altered wettability (during and after hydrocarbon migration) influence the profile of initial water saturation ($S_{wi}$,) and the production characteristics of the formation. Most reservoirs are water-wet prior to oil migration and exhibit a long transition zone, through which saturation changes gradually from mostly oil with irreducible water at the top of the transition zone to water at the bottom.

This distribution is determined by capillary pressure, Pc. Oil migrating into an oil-wet reservoir displays a different saturation profile: essentially maximum oil saturation down to the base of the reservoir. This difference reflects the ease of invasion by a wetting fluid. Layers within formations can also have different wetting states because of lithology variations. A tight zone may remain water-wetted if little or no oil migrates into it, while surrounding formations are converted to a more oil-wet state. Other wetting variations may not be so easily explained. Several carbonate reservoirs in the Middle East are thought to have a variation of wettability by layer, but the cause is not yet understood. This wetting heterogeneity can affect recovery. For example, models using ECLIPSE reservoir simulation software incorporated parameters typical of a Middle East carbonate reservoir, with water-wet layers and oil-wet layers having similar permeabilities. Under waterflood, water penetrates the water-wet layers more readily than the oil-wet layers because of capillary effects. The simulation shows that little oil would be recovered from the oil-wet layers (See Stacey R, Williams M J. Validation of ECLIPSE Reservoir Simulator for Geothermal Problems. GRC Transactions. 2017; 41; Andersen P Ø, Evje S, Kleppe H, Skjaeveland S M. A model for wettability alteration in fractured reservoirs. SPE Journal. 2015 Dec. 1; 20(06):1-261; Morrow N R: "Wettability and Its Effect on Oil Recovery," Journal of Petroleum Technology 42, no. 12 (December 1990): 1476-1484; Panga M K R, Ooi Y S, Chan K S, Enkababian P, Samuel M, Koh P L and Cheneviere P: "Wettability Alteration Used for Water Block Prevention in High-Temperature Gas Wells," World Oil 228, no. 3 (March 2007): 51-58; Buckley J S, Liu Y and Monsterleet S: "Mechanisms of Wetting Alteration by Crude Oils," paper SPE 37230, SPE Journal 3, no. 1 (March 1998): 54-61. 10; Al-Maamari RSH and Buckley J S: "Asphaltene Precipitation and Alteration of Wetting: The Potential for Wettability Changes During Oil Production," paper SPE 84938, SPE Reservoir Evaluation & Engineering 6, no. 4 (August 2003): 210-214; incorporated herein by reference in entirety).

Wettability also affects the amount of oil that can be produced at the pore level, as measured after waterflood by the residual oil saturation, $S_{or}$. In a water-wet formation, oil remains in the larger pores, where it can snap off, or become disconnected from a continuous mass of oil, and become trapped. In an oil-wet or mixed-wet formation, oil adheres to surfaces, increasing the probability of a continuous path to a producing well, and resulting in a lower $S_{or}$.

Because the impact of wettability extends from pore scale to reservoir scale, wettability can affect project economics. Through the parameters $S_{wi}$ and $S_{or}$, wettability influences oil recovery. In addition, the relative permeabilities of oil and water vary with formation wettability. In projects with huge upfront capital expenditures for facilities, such as those in deep-water areas, underestimation of wettability is costly. Imbibition forces, e.g., the tendency of a formation to draw in the wetting phase, determine how easily water can be injected and how it moves through a water-wet formation. Water breakthrough occurs later in a waterflood, and more oil is produced before the water breaks through in a water-wet reservoir than in an oil-wet reservoir.

Different technologies, methods, and tools are used to analyze and characterize wettability, reservoir rocks, fluids, and rock/fluid interactions. The Amott-Harvey test in general use includes first preparing the sample by centrifuging it in brine. This is followed by centrifuging in oil to irreducible water saturation. Four basic measurements follow: the amount of oil spontaneously imbibed, the amount of oil forcibly imbibed, the amount of brine spontaneously imbibed, and the amount of brine forcibly imbibed. The combined index—the Amott-Harvey wettability index—is calculated by subtracting the displacement by oil ratio from the displacement by water ratio. The displacement by water ratio ($I_w$) is the ratio of the spontaneously imbibed water to the sum of spontaneously imbibed and forcefully injected water. The displacement by oil ratio (Io) is the ratio of the spontaneously imbibed oil to the sum of spontaneously imbibed and forcefully injected oil. The Amott-Harvey index $I=I_w-I_o$ and is positive if the sample is water-wetted, near-zero if amphiphilic and negative if oil-wetted (See: Boneau, D. F., Clempett, R. L., 1977, A surfactant system for the oil-wet sandstone of the North Burbank unit: Journal of Petroleum Technology, v. 29, p. 501-506., 10., 2118/5820-PA, incorporated herein by reference).

The USBM method uses the same types of data but considers the work required to do the forced displacement. This requires calculating the area under the capillary pressure curve obtained during the forced displacement. Generally, the capillary pressure displacement is done by centrifuging, but other capillary displacement techniques can be used. Wettability (W) of the sample is determined by comparing the log of the area (A1) under the oil-displacing brine curve with the log of the area (A2) under the brine-displacing oil curve. The USBM index is defined by the following equation: W=log A1/A2. Because the range of the pores corresponding to forced injection is applied, the results poorly correlated with the results of Amott-Harvey (See: Donaldson, E. C., Thomas, R. D., Lorenz, P. B., 1969, Wettability determination and its effect on recovery efficiency: Society of Petroleum Engineers Journal, v. 9, p. 13-20., 10., 2118/2338-PA; Crocker, M. E., Marchin, L. M., 1986, Evaluation and determination of cross-correlations between wettability methods—Status Report Project BE7: Bartlesville, Okla., National Institute for Petroleum Energy and Research; incorporated herein by reference). A combined method is known (See: Anderson, W. G., Wettability literature survey—Part 2, Wettability measurements: Journal of Petroleum Technology, v. 38, p. 1246-1262., 10., 2118/13933-PA; Shamra, M. M., Wundlerlich, R. W., 1985, The alteration of rock properties due to interactions with drilling fluid components: Annual Technical Conference and Exhibition of the Society of Petroleum Engineers, Las Vegas, Nev., September 22-25, SPE 14302; incorporated herein by reference). Both USBM and Amott-Harvey methods have "blind spots", treating the systems identically with very different surface tensions and contacts angles. Both methods are laborious, imprecise and for smaller samples are likely to generate a significant relative error, due to propagation of multiple steps. There is an unmet need in a rapid, in-situ, downhole method of wettability measurements better correlating with the observed permeabilities and yields of the reservoirs.

Nuclear magnetic resonance (NMR) has become an important tool for studying reservoir behavior and properties. Furthermore, in formation evaluation, NMR wireline logs have become a cornerstone measurement tool. NMR has a variety of applications in the oil industry. For example, different petrophysical parameters are determined and assessed by NMR including wettability. $T_2$ measurements can be conducted on carbonate and sandstone samples saturated with oil and brine at different saturations and wettability index based on $T_2$ measurements obtained from rock samples (See Johannesen E B, Riskedal H, Tipura L, Howard J J, Graue A. Wettability characterization by NMR $T_2$ measurements in Edwards limestone rock. InInternational Symposium of the Society of Core Analysts 2007 Sep. 10 (pp. 10-13); Looyestijn W J. Wettability index determination from NMR logs. Petrophysics. 2008 Apr. 1; 49(02); incorporated herein by reference in entirety).

Laboratory method—the measurement of Amott-Harvey wettability index—is applicable to both carbonate and sandstone samples for verification purposes of NMR proxies. NMR can be used to predict wettability and produces accurate measurements by a rapid, in-situ applicable and economical method. There is a need to test such a method which can be incorporated in overall exploratory logging of a reservoir, directly or by recalibration to even more convenient NMR approaches.

Nuclear Magnetic Resonance (NMR) is a phenomenon that occurs when the atomic nuclei response to magnetic fields (See: Akkurt, R., Bachman, H. N., Minh, C. C., Flaum, C., LaVigne, J., Leveridge, R., and White, J. (2008). Nuclear magnetic resonance comes out of its shell. Oilfield Review, 20(4), 4-23). Hydrogen has a relatively large magnetic moment and is abundant in both water and hydrocarbon within the pore space (See: Branco, F. R., & Gil, N. A. (2017). NMR study of carbonates wettability. Journal of Petroleum Science and Engineering, 157(March), 288-294). Applying a static magnetic field followed by a series of radiofrequency pulses cause the hydrogen atoms to be excited and valuable information is obtained once they return to their original state. Based on the type of the radiofrequency pulses, different NMR parameters are measured. In particular, Carr-Purcell-Meiboom-Gill (CPMG) sequence is an example of the radiofrequency pulse sequences, and it is the one most suitable for $T_2$ measurements.

$T_2$ is an important parameter obtained from NMR measurements and is a function of pore size distribution (surface relaxation), fluid type (diffusion relaxation) and fluid viscosity (bulk relaxation) as shown in equation 1. For the bulk fluid, there is no surface relaxation effect, so the only relaxations are bulk and diffusion:

$$\frac{1}{T_2} = \frac{1}{T_{2,bulk}} + \frac{1}{T_{2,surface}} + \frac{1}{T_{2,diffusion}} = \frac{1}{T_{2,bulk}} + \frac{\rho A_S}{V_p S} + \frac{1}{12}\gamma^2 G^2 T_E^2 D^2 \quad (1)$$

Condition (1) is an energy balance for a pore since the relaxation time reciprocals indicate the rate of magnetization energy loss in a unit volume.

$T_{2, bulk}$—is the relaxation time in the bulk fluid;
$T_{2, surface}$—is the relaxation time on the pore walls;
$T_{2, diffusion}$—is the relaxation time, associated with the loss of $T_2$ magnetization component by diffusion.

Applying a CPMG pulse sequence reduces field inhomogeneity so the relaxation from diffusion is negligible, so the last term in equation (1) is cancelled, as shown in equation (2).

$$\frac{1}{T_2} = \frac{1}{T_{2,bulk}} + \frac{1}{T_{2,surface}} = \frac{1}{T_{2,bulk}} + \frac{\rho A_S}{V_p S} \quad (2)$$

Wherein:
$A_s$—is the pore surface;
$V_{pS}$—is the pore volume;
$\rho$—is the pore wall relaxivity, the amount of magnetization energy scattering per a unit of pore surface.

Wettability could be evaluated qualitatively from NMR $T_2$ distribution. NMR measurements have sensitivity to wettability since the relaxation rate is enhanced when the fluid contacts the pore surfaces (See: Freedman, R., Heaton, N., Flaum, M., Hirasaki, G. J., Flaum, C., & Hurlimann, M. (2003). Wettability, saturation, and viscosity from NMR measurements. SPE Journal, 8(4), 317-327). On the pore surface, both hydrocarbon and water experience lower "tumbling rate", more efficient magnetization energy transfer and shorter T2 relaxation period. Therefore, surface relaxation is usually dominant over bulk and diffusion relaxations for the wetting phase in a partially saturated rock. However, the non-wetting phase is not influenced by surface relaxation since the pore surface is only contacted by the wetting phase so it tends to behave like a bulk fluid (See: Freedman, R., Heaton, N., Flaum, M., Hirasaki, G. J., Flaum, C., & Hürlimann, M. (2003). Wettability, saturation, and viscosity from NMR measurements. SPE Journal, 8(4), 317-327— incorporated herein by reference in its entirety).

A quantitative index for characterizing wettability based on T2 measurements can be proposed:

$$I_{NMR} = \left( \frac{T_{2,LM}^{Swi} - T_{2,LM}^{Sor}}{T_{2,LM}^{Sor}} \right) \quad (3)$$

Wherein:

$I_{NMR}$—is wettability index determined by NMR;

$T^{Swi}_{2,LM}$—is the relaxation time of the brine in the imbibition state in the porous samples;

$T^{Sor}_{2,LM}$—is the relaxation time of the brine in the saturation state in the porous samples (saturation is defined as the volume fraction of the pores filled by the fluid).

The method is described in Al-Mahrooqi, S. H., Grattoni, C. A., Muggeridge, A. H., Zimmerman, R. W., & Jing, X. D. (2006), Pore-scale modelling of NMR relaxation for the characterization of wettability. Journal of Petroleum Science and Engineering, 52(1-4), 172-186, incorporated herein by reference in entirety.

This model was tested to calculate the wettability index from NMR for carbonate rocks and compare the results with the benchmark Amott-Harvey index (See: Branco, F. R., & Gil, N. A., NMR study of carbonates wettability. Journal of Petroleum Science and Engineering, 157(March), 288-294 (2017), incorporated herein by reference). Branco et al. used Outcrop dolomite and coquina samples. The results show disagreement with the Amott-Harvey index quantitatively and qualitatively. The disagreement is attributed to the pore coupling which means that the macro and micropore systems connectivity is enhanced. Due to the triggered microscopic dissolution, the salt concentration difference between the injected water and the formation water affects the results (relaxation in solvate shells is faster than in a distilled pure water).

The method proposed in U.S. Pat. No. 9,575,203 used NMR $T_2$ relaxation measurements to establish single-phase (oil or aqueous phase) NMR wettability index of a rock after secondary and tertiary oil recovery processes. It developed an index that requires saturation values and $T_2$ relaxation times for 100% oil and 100% aqueous phase saturation conditions. This requirement is technically complex. The publication does not disclose a simpler index that that does not require $T_2$ measurements for 100% oil and 100% aqueous phase saturation conditions. Validated using Amott-Harvey index was not conducted in U.S. Pat. No. 9,575,203.

The method proposed in CN108020488 discloses a device that provides a nuclear magnetic resonance evaluation of the wettability of a sandstone oil-gas reservoir, that includes: under the effective pressure and temperature conditions prevalent in the rock formation, obtaining a first NMR $T_2$ spectrum of compact sandstone; under effective pressure and normal temperature condition, obtaining a second NMR $T_2$ spectrum of the residual oil state in tight sandstone. The procedure also discloses obtaining a third NMR $T_2$ spectrum detected in the bound water state as well as crude displacement to irreducible water state in a sandstone. The process also comprises water flooding of the compact sandstone in the residual oil state and taking $T_2$ spectrum. The analysis of the displaced states combines with detecting the compact sandstone $T_2$ spectrum. CN108020488 proposed an NMR index that works for sandstone oil-gas reservoir, while no respective models were developed for carbonates. The model was not validated with any conventional methods such as Amott-Harvey or USBM.

The method proposed in U.S. Pat. No. 6,765,380 discloses reservoir wettability determination by comparing NMR relaxation time (i.e., $T_1$ or $T_2$) distributions of a bulk crude oil sample with the relaxation time distributions of the same crude oil in the reservoir rock. Analogously, the brine $T_2$ distribution in the rock is shifted to shorter $T_2$ as compared to that of the 100% water-saturated state. The bulk state fluids and the mixed state fluids in the rock are compared. This patent discloses 100% brine and oil-saturated samples as well as mixed states produced by an Amott-Harvey methodology. The order of water and oil displacement is not immediately apparent. U.S. Pat. No. 6,765,380 uses NMR $T_2$ measurements to determine wettability qualitatively based on the surface relaxation theory, while quantitative estimation of wettability based on the same theory is of more interest for the industry.

U.S. Pat. No. 9,405,037 discloses methods for determining wettability from NMR.

The disclosure teaches the use of nuclear magnetic resonance (NMR) data for bulk aqueous fluids and bulk oil, thereby generating a wettability profile across a pore spectrum for the aqueous and/or oil fluids over a plurality of pore sizes of the porous media. The saturation values follow the known saturation history of the porous media. In one case, porous media was originally strongly oil-wet and then flooded with the aqueous fluid, the water saturation is monotonically increasing with increasing pore size. In another case, the porous media was originally strongly water-wet and then flooded with oil, the water saturation is monotonically decreasing with increasing pore size. This dependence on the pore size is an additional technical feature, introducing avoidable complexity. Prior knowledge of pore size distribution can be sometimes challenging.

WO2019199304 discloses determining sub-surface formation wettability characteristics utilizing nuclear magnetic resonance and bulk fluid measurements. The method comprises modifying a pump pressure of an injection fluid after obtaining the first sets of data values, wherein a pressure difference between the injection fluid and a hydrocarbon is equalized; pumping the injection fluid out of the first location and incrementally increasing a value of the pump pressure, wherein the first set of injection fluid and hydrocarbon saturation data values is generated by measuring an injection fluid saturation data value and a hydrocarbon saturation data value between the incremental pump pressure value changes; stopping the pumping injection fluid out when the injection fluid saturation data value is irreducible before and after applying the incremental pump pressure value change; modifying the pump pressure, after obtaining the second sets of data values, wherein a pressure difference between the injection fluid and the hydrocarbon is equalized; pumping the injection fluid into the first location and incrementally increasing the pump pressure value, wherein the second set of injection fluid and hydrocarbon saturation data values is generated by measuring the injection fluid saturation data value and the hydrocarbon saturation data value between the incremental pump pressure value changes; stopping the pumping injection fluid into when the hydrocarbon saturation data value is irreducible before and after applying the incremental pump pressure value change; and determining the wettability characteristics utilizing the first and second sets of the injection fluid and hydrocarbon saturation data values. WO2019199304 proposed an index that has a wide range of values such that it could be larger than 1 or less than −1. This could be confusing when comparing with traditional wettability index such as USBM and Amott-Harvey methods. A preferred index is restricted between −1 and 1 and three wettability types are defined between this restricted range. The initial state before pressure pumping or injection is at, or substantially at, an irreducible water saturation level ($S_{wi}$), also see FIGS. 5 and 7. This publication does not disclose 100% brine saturation, which is an essential difference with any method where the process starts with 100% brine saturation. There is no heating and vacuum step to prepare the sample for oil imbibition by changing the number of hydrogen bonds on the pore surface.

The research report by J. Chen, G. J. Hirasaki, M. Flaum titled "NMR wettability indices: Effect of OBM on wettability and NMR responses" discloses an NMR model to quantify rock wettability by two NMR wettability indices from either water or oil responses. This model was tested with water/oil partially saturated Berea cores at different wettability conditions. Correlations show that both NMR indices agree well with the Amott-Harvey wettability. Chen et al. introduced an oil-wettability index that requires the $T_2$ value of 100% oil-saturated sample which consumes time and is not applicable downhole which restrict this method to the laboratory. A more preferred approach consists of an oil-wettability index that requires the $T_2$ value at irreducible water saturation which is the initial condition in the reservoir.

The research report by S. H. Al-Mahroogi, C. A. Grattoni, A. K. Mossb, X. D. Jinga titled "An investigation of the effect of wettability on NMR characteristics of sandstone rock and fluid systems" published in the Journal of Petroleum Science and Engineering, 2003, v. 39/3-4, pp 389-398 discloses NMR T2 spectrum measurements that were performed in reservoir core plugs at different saturations and wettability states. The samples were first cleaned by hot solvent extraction, then saturated with brine and a drainage/imbibition cycle performed. At the lowest brine saturation, the same samples were aged in crude oil and a further drainage/imbibition cycle performed. NMR transverse relaxation time, T2, was measured on fully saturated samples, at residual saturations and some intermediate saturation values. The wettability of the samples is evaluated using Archie's saturation exponent and by Amott-Harvey wettability index. The wettability of the cores studied ranged from mixed-wet to oil-wet. The study deduced wettability qualitatively from NMR measurements and compared it to Amott-Harvey index with a qualitative-only match. In addition, this study is restricted to sandstone only, while more than 50% of the reservoirs are in carbonates. \

The research report by M. J. Dick, D. Veselinovic, D. Green titled "Spatially resolved wettability measurements using NMR wettability index" published in the materials of the International Symposium of the Society of Core Analysts held in Trondheim, Norway, 27-30 Aug. 2018 discloses T2-based NWI to spatially resolved T2 NMR measurements to monitor changes in wettability and saturation along rock core plugs. In order to derive an NMR wettability index, NMR $T_2$ spectra of 100% brine saturated, 100% oil-saturated, bulk oil and bulk brine are needed. The bulk wettabilities were compared to measurements done using the standard Amott test and oil/water saturations were confirmed by repeating experiments using NMR invisible D20. The sequence of the experimental steps includes saturating the porous object by the more polar fluid until reaching the asymptotic limit and measuring the T2, $S_{OR}$ signal in the saturated object. A wettability index by Dick et. al. requires the $T_2$ value of 100% oil-saturated sample which consumes time and is not applicable downhole which restricts this method to the laboratory. In addition, it requires the knowledge of prior parameters such as saturation.

There is a need for an economical NMR calibration method that aligns rock oil or water wettability measured in downhole logging with the benchmark Amott-Harvey method. The method preferably applies to both carbonate and sandstone rocks and should be realistic in the order of wetting and preferably start with water flooding. The result should be expressed in the recognizable units to relate to the benchmark methods.

SUMMARY OF THE INVENTION

According to a first aspect, the invention relates to a method of evaluation of wettability of a porous body by NMR, more specifically of a hydrocarbon-bearing rock formation, comprising:

a) Providing a less polar (oil) and a more polar (brine) fluid, with the chemical composition comprising 1H, 2H, 13C or 14C isotopes;

b) Saturating the porous object by the brine, by applying a pressure range sufficing to overcome the capillary pressure in all pores, reaching full saturation by the brine ($S_w$=1);

c) Measuring the $T_{2,\ WB}$ signal in the bulk brine;

d) Displacing the brine by oil by applying a pressure range sufficing to overcome the capillary pressure in all pores and bringing the content of the brine to the final non-decreasing amount, wherein the irreducible amount corresponds to pore wall-bound water;

e) Measuring the $T_{2,\ sWR}$ signal in the saturated object, wherein the signal belongs to the injected or imbibed oil in the pores in the state of exchange with the brine corresponding to the residual irreducible brine quantity;

f) Measuring the $T_{2,\ OB}$ signal in oil bulk;

g) Saturating the porous object by the brine until reaching the asymptotic limit (irreducible oil);

h) Measuring the $T_{2,\ SOR}$ signal in the saturated object, wherein the signal belongs to the brine coexisting with the residual irreducible oil in the sample;

i) Computing the quantity $$WI_w = \frac{T_{2,WB} - T_{2,Sor}}{T_{2,WB}},$$

wherein the quantity is the difference between the signal of the bulk brine and the signal of the injected brine at the irreducible oil quantity, wherein the difference is normalized to the signal of the bulk brine;

k) Computing the quantity $$WI_o = \frac{T_{2,OB} - T_{2,Swr}}{T_{2,OB}},$$

wherein the quantity is the difference between the signal of the bulk oil and the signal of the injected oil at the irreducible brine quantity, wherein the difference is normalized to the signal of the bulk oil;

l) Computing wettability $I_{NMR} = WI_w - WI_o$

According to a second aspect, the inventive method can be described as "rapid laboratory" method, to be completed within 20 minutes for a data point collected in a single section of a well. The method includes extracting of chippings while drilling that belong to a particular well section, rapid forming of a standard core in a standard pressurized tester cell linked to a portable inexpensive NMR device, exposing the core to brine imbibition, NMR measurements, exposure to oil imbibition, followed by NMR measurements and reporting of the depth-specific values of wettability.

According to a third aspect, the pressurized cell, accompanying tools, NMR device, conductivity measurement equipment, microscope and software form a kit, adapted for rapid processing of a sample simultaneously with the ongoing drilling. The results are practically available in real-time and provide feedback to inform the decisions regarding drilling continuation.

According to a fourth aspect, the additional information pertaining to porosity, pore distribution, tortuosity and anisotropy of the sample is extracted in the same NMR, microscopy and conductivity analysis and is applied to support the decisions based on wettability determination as a part of the same rapid-response kit.

According to a fifth aspect, the results produced by the rapid kit can be re-calibrated to the real-time logging results produced directly in the well by the integrated sensor assembly.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 18: Experimental procedure flowchart followed in this study.

DETAILED DESCRIPTION OF THE EMBODIMENTS

Figure 1:
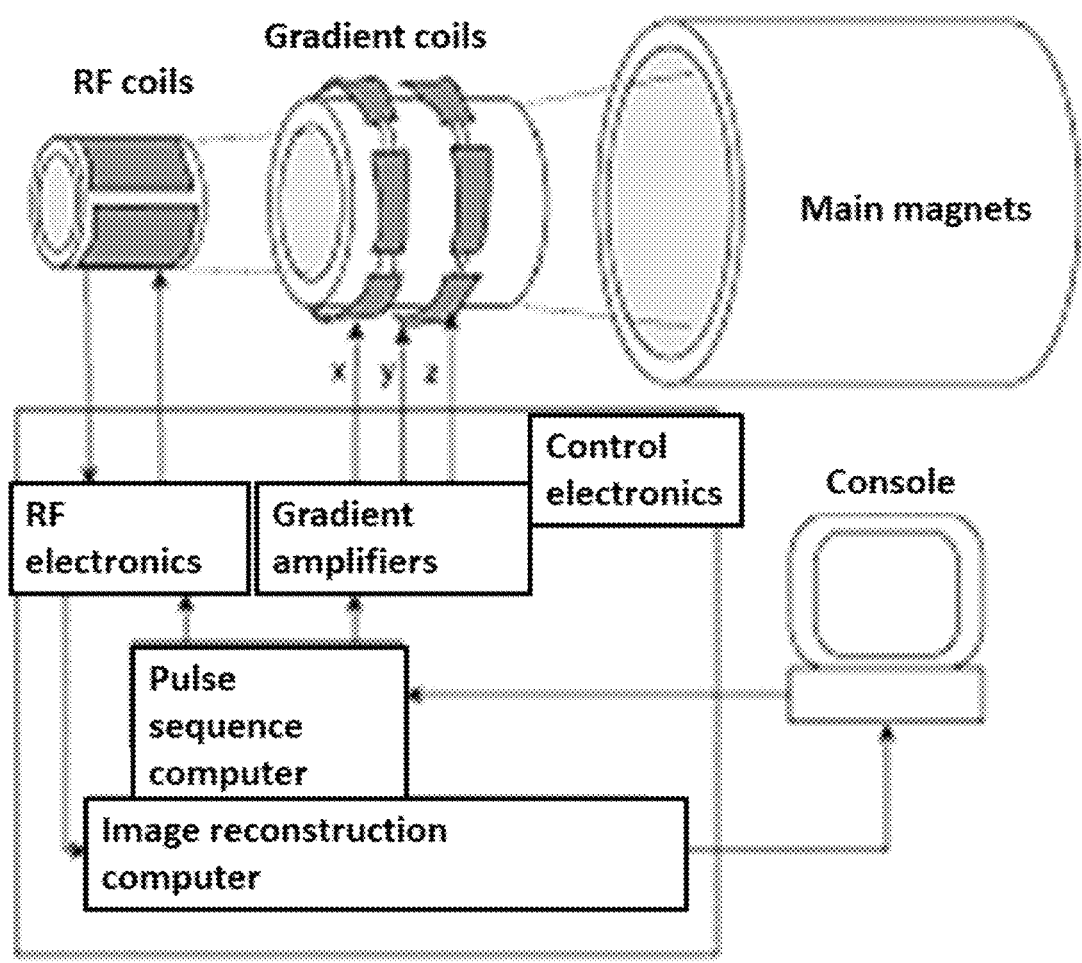
FIG. 1: The basic components of the gradient NMR installation.

Embodiments of the present disclosure will now be described more fully hereinafter with reference to the accompanying drawings, in which some, but not all of the embodiments of the disclosure are shown.

The present disclosure will be better understood with reference to the following definitions.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g. 0 wt %).

As used herein, the term "flip" and "flip angle" refers to the change in the orientation of the nuclear magnetic momenta in the primary magnetic field due to the absorption of radiofrequency pulse. The resulting macroscopic magnetic momentum gyrates with the resonant Larmor precession rate producing the signal detectable by a separate or the same radiofrequency coil (that produced the said pulse).

As used herein, the terms "collective", "global' and "macroscopic" are equivalent when referred to a transverse magnetization vector M, also mentioned as "net magnetization".

As used herein, the term T1 relaxation refers to re-orientation of the nuclear spins in the direction of the primary magnetic field along the axis Z form the transverse orientation in the plane X0Y perpendicular to the axis Z. As a result, the global magnetization vector turns by 90 degrees and aligns with Z.

As used herein, the term T2 relaxation refers to de-cohering of the spins in the transverse orientation to the primary magnetic field, after absorbing the energy of the RF pulse. The resonance nature of the energy transition leads to the same phase of precession for all spins and therefore the maximal possible transverse magnetization M value. Because of passing energy to the environment and field inhomogeneities, the individual magnetic momenta begin precession in different phases. The global magnetization minimizes, even without considering the re-orientation by the T1 mechanism.

As used herein, the term "spin echo" refers to the process of producing the maximal NMR signal after the RF pulse is turned off, explaining the term "echo". The phenomenon arises due to the presence of leading and lagging elements measured relative to the position of the global transverse magnetization vector M. Some spins "flip" first and some remain aligned with the primary field producing the lagging elements. The additional energy is supplied producing 180 degrees flip. In that stronger transverse magnetization environment, the individual spins feel the local field M as well as B and become synchronized in M not unlike the iron spin domains in a ferromagnetic after the magnetizing current is turned off. Since this focusing leads to maximization of the signal and takes place after the excitation energy is not provided any more, it was termed "echo".

As used herein, the term "NMR-derived diffusion coefficient" refers to the process of producing a signal in the detector coil by supplying RF energy to produce 90 degree or lower flip angle, destroying the signal by forcefully decohering the transverse magnetization vector by a magnetic gradient pulse, waiting a pre-set interval of time for the initial phase-labelled population of spins to diffuse away, refocusing the phase-labeled spins by a combination of a RF pulse and a magnetic gradient pulse. Phase-labeling means that that the spins that interacted with the first pair of RF and magnetic pulses will interact with the second pair, restoring the signal. The described process, with variations, is termed "a sequence". The difference between the initial and the restored signal can be related to the diffusion coefficient by the Stejskal and Tanner sequence equations.

FIG. 1 presents the simplified scheme of a typical apparatus for modern NMR analysis. The installation comprises the main magnet, the gradient coils, the radiofrequency (RF) coils, RF electronics, gradient amplifiers, control electronics, operator console, pulse sequence computer and image reconstruction computer. In operation, the main magnet produces a strong magnetic field in the range 0.5-3 Tesla. The gradient coils superimpose the additional (+) or (−) 0.1 Tesla contributions in the direction transverse to the axis Z (the axis of rotation inside the main magnet, the axis Z is aligned with the direction of the main magnetic field). Typically, one gradient is created in the direction of the axis X and another in the direction of Y. The extent of the gradient varies along Z. The result of the gradient application is partitioning of the space within the combined magnetic fields into small elements—voxels, which produce the diverse and voxel-specific resonance conditions. Based on Fourier series deconvolution it is possible to trace the spin echoes to the individual voxels (see below) and therefore reconstruct the spatial orientation of the factors affecting the signal magnitude (concentrations) and relaxation times (diffusion coefficients).

The magnetic fields interact with the nuclei possessing uncompensated spins (odd number of protons or neutrons, counted separately in a nucleus). The spins are quantum qualities, but they manifest empirically as circular currents running around the nuclei at very high velocity and creating magnetic momenta, expressed as a product of the current by the area of the conductive contour (Amper×m$^2$). The momenta are vector values and behave at a schematic level analogously to a macroscopic frame with an electric current placed in a magnetic field. Such a frame will align its normal vector ("magnetic momentum vector") with the direction of the field (axis Z), the macroscopic frame will "freeze" perpendicularly to the field.

The nuclei suitable for NMR comprise, without limiting, the following list of isotopes: $^{27}$Aluminium, $^{39}$Argon, $^{75}$Arsenic, $^{135}$Barium, $^{137}$Barium, $^{9}$Beryllium, $^{209}$Bismuth, $^{10}$Boron, $^{11}$Boron, $^{79}$Bromine, $^{81}$Bromine, $^{111}$Cadmium, $^{113}$Cadmium. $^{43}$Calcium, $^{13}$Carbon, $^{133}$Cesium, $^{35}$Chlorine, $^{37}$Chlorine, $^{53}$Chromium, $^{63}$Copper, $^{65}$Copper, $^{59}$Cobalt, $^{2}$Deuterium, $^{19}$Fluorine, $^{69}$Gallium, $^{71}$Gallium, $^{73}$Germanium, $^{3}$Helium, $^{1}$Hydrogen, $^{2}$Hydrogen, $^{3}$Hydrogen, $^{113}$Indium, $^{115}$Indium, $^{127}$Iodine, $^{57}$Iron, $^{83}$Krypton, $^{138}$Lanthanum, $^{139}$Lanthanum $^{207}$Lead, $^{6}$Lithium, $^{7}$Lithium, $^{25}$Magnesium, $^{55}$Manganese, $^{199}$Mercury, $^{201}$Mercury, $^{95}$Molybdenum, $^{97}$Molybdenum, $^{21}$Neon, $^{61}$Nickel, $^{14}$Nitrogen, $^{15}$Nitrogen, $^{187}$Osmium, $^{189}$Osmium, $^{17}$Oxygen, $^{31}$Phosphorus, $^{195}$Platinum, $^{39}$Potassium, $^{40}$Potassium, $^{41}$Potassium, $^{1}$Proton, $^{103}$Rhodium, $^{85}$Rubidium, $^{87}$Rubidium, $^{45}$Scandium, $^{77}$Selenium, $^{29}$Silicon, $^{107}$Silver, $^{109}$Silver, $^{23}$Sodium, $^{87}$Strontium, $^{33}$Sulfur, $^{123}$Tellurium, $^{125}$Tellurium, $^{115}$Tin, $^{117}$Tin, $^{119}$Tin, $^{47}$Titanium, $^{49}$Titanium, $^{3}$Tritium, $^{183}$Tungsten, $^{235}$Uranium, $^{50}$Vanadium, $^{51}$Vanadium, $^{129}$Xenon. $^{131}$Xenon, $^{67}$Zinc. Of note, deuterium (2H) has the spin value+1, despite having an even number of protons and neutrons. However, the Pauli principle guiding filling of energy levels in all quantum systems applies to each particle type individually; therefore the combination of a proton and a neutron with parallel spins is not banned at the same energy level and has a lower energy than an antiparallel combination, explaining the almost exclusive dominance of the triplet deuterium vs. a possible singlet state with the antiparallel spins. By contrast, two neutrons or two protons at the same energy level must have antiparallel mutually compensating spins being of the same nature.

The magnetic momenta of the nuclei should ideally align strictly along the axis Z, following the direction of the magnetic field B. However, this is impossible due to thermal motion conferring variable quantity of torque to the spinning nuclei, oriented in the magnetic field. Analogously to a mechanical toy "spinning top" or a gyroscope in gravitational fields, the introduction of the torque by the external forces alters the orbital momentum of the spinning system.

Newton's second law of motion can be expressed mathematically, $$F = m \times a \tag{4}$$

or force=mass×acceleration. The rotational equivalent for point particles may be derived as follows:

$$L = I \times \omega \tag{5}$$

Wherein I—is the momentum of inertia and ω—is the angular velocity. Thus, the torque τ (i.e. the time derivative of the angular momentum) is given as:

$$\tau = (dI/dt) \times \omega + I \times (d\omega/dt) \tag{6}$$

The equation (6) is the rotational analogue of Newton's Second Law and the torque is not always proportional or parallel to the angular acceleration. The external torque introduces a perpendicular component to the original orbital momentum $L_z$ of the body spinning relative to the axis Z. Under the stationary conditions, this permanent perpendicular component is directed along the tangent to a circular trajectory of motion accepted by the top of the spinning body. The circular motion that establishes after reaching the stationarity phase (after dampening of nutational motion at the non-stationary phase) is termed precession. More than one precession motions are possible simultaneously, but for simplicity, only one is assumed in the plane X0Y, normal to the axis Z. Under these simplifying assumptions, the precession angular velocity is:

$$\omega_p = \frac{mgr}{I_s \omega_s} = \frac{\tau}{I_s \omega_s} \tag{7}$$

$$T_p = \frac{4\pi^2 I_s}{mgrT_s} = \frac{4\pi^2 I_s}{\tau T_s} \tag{8}$$

Where $\omega_p$—is the precession movement angular velocity, $T_p$—precession movement period, $I_s$—is the inertia momentum vs. the spinning axis, $\omega_s$—is the angular velocity vs. the spinning axis, τ is the applied torque. Analogously to mechanical systems, a spinning particle in a magnetic field experiences a precession movement due to its interactions. When a magnetic moment is placed in a magnetic field B, it experiences a torque which can be expressed in the form of a vector product:

$$\tau = \mu \times B \tag{9}$$

Where μ is the magnetic momentum and B is the magnetic field. For the momentum coinciding with B, the torque is zero but is non-zero for a system permuted by thermal motion or charge-charge interactions. When a torque is exerted perpendicular to the angular momentum L, it produces a change in angular momentum ΔL which is perpendicular to L, causing it to precess about the Z-axis. Labelling the precession angle as φ, we can describe the effect of the torque as follows:

$$\tau = \frac{\Delta L}{\Delta t} = \frac{L \sin\theta \Delta\phi}{\Delta t} = |\mu B \sin\theta| = \frac{e}{2m_e} LB \sin\theta \tag{10}$$

The L sin θ is the projection of the original orbital momentum L aligned with the axis Z onto the perpendicular plane X0Y as a result of torque. ΔL is the change of orbital momentum, and this change is equal to a vector difference ΔL between the component L sin θ at the time $t_1$ and the same component at the time $t_2$, resulting due to covering the angle Δφ in the precession. Also, μ=(e/2$m_e$) L—the equation (10) provides a link between torque expressed through magnetic momentum and its equivalent expressed through angular momentum, both being proportional via gyromagnetic ratio (e/2$m_e$).

Considering the definition of torque according to (9) and elementary transformations produces the final form (11) below. The precession angular velocity (Larmor frequency) is $$\omega_{Larmor} = \frac{d\phi}{dt} = \frac{e}{2m_e} B \tag{11}$$

The analysis of (9)-(11) shows that both the original orbital momentum L and the perpendicular component L sin θ induced by the external torque are canceling in the final expression (11). This canceling is absent in the mechanical analogy above. The resulting precession frequency is inversely proportional to the inertia $m_e$ of the spinning particle, directly proportional to the charge e and the strength of the magnetic field B. The Larmor precession frequency is a characteristic of a particle in a magnetic field and does not reflect the strength of the permutations causing deflections from the axis Z (L sin θ is canceled). Yet as a quantum system, a single particle in this minimal energy state would absorb electromagnetic energy at the same frequency as Larmor precession.

A mechanical analogy is helpful to illustrate why the resonance condition is reached at the Larmor frequency. Assuming a heavy spinning top with an infinite momentum of inertia and periodic impacts by an external force, the energy transfer is the most effective when the period between the impacts is exactly equal to the period of precession. Moving from a laboratory coordinate system to the one originating in the precession spinning top leads to the external force arriving at different positions on the precession trajectory if the periods between the impacts and the precession period are different. Over an extended timeframe, the positions of impacts will find the opposing and equal counterparts, thus mutually neutralizing. For equal periods, the impacts arrive always at the same position, leading to the maximized accumulation of the transferred energy. The similar principle of the external force applied at the inner or natural frequency of oscillations defines the better-known conventional resonance.

Figure 2:
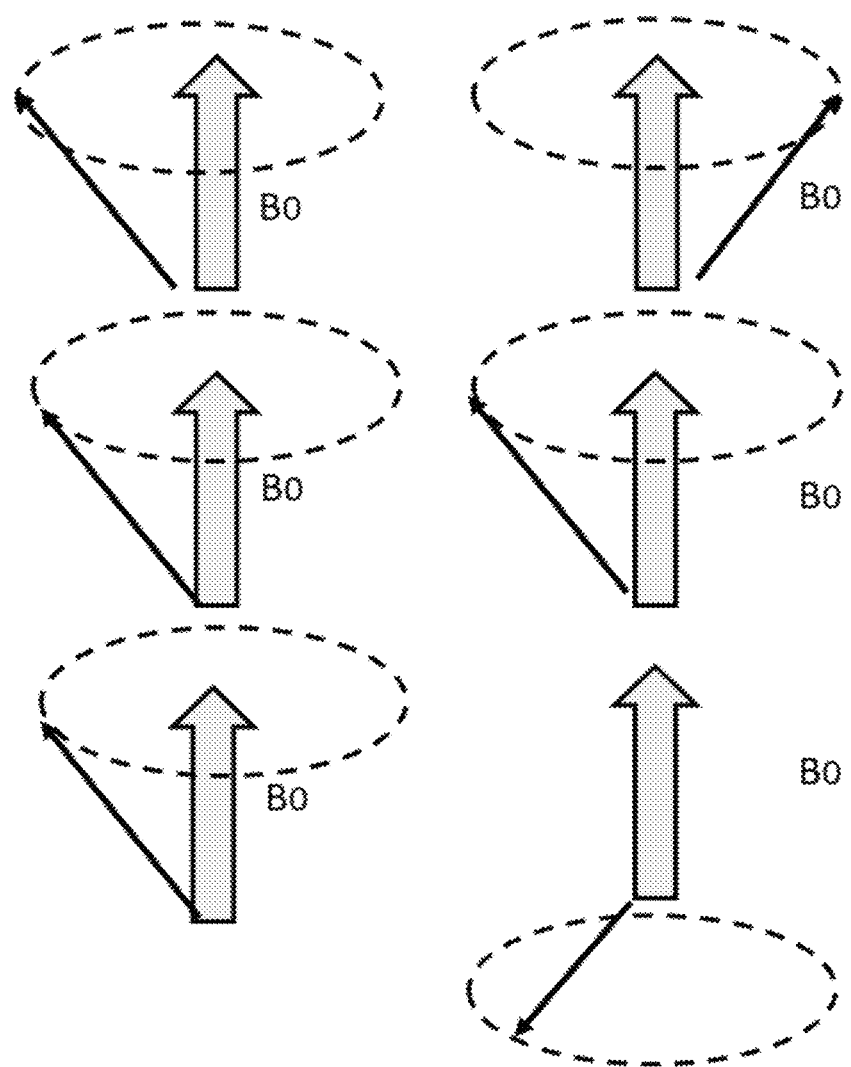
FIG. 2: The scheme of 90 degree flipping and synchronization for the global magnetization vector.

The individual nuclei oriented along the field B are at the minimal energy and when excited by the electromagnetic wave originating in the radiofrequency coils (RF coil), they experience a resonance transition and "flip" the spins in the opposite direction (against the field). This process is time-dependent, and with longer exposure to the excitation energy at the frequency of Larmor precession, the progressively greater proportion of the individual nuclei changes orientation. If originally the summary magnetization vector (vector sum of all individual magnetic momenta) was directed along the axis Z with the field, upon "flipping" the summary magnetization vector rotates by 90, 180 or an arbitrary optimized angle without limitation. FIG. 2 demonstrates the scheme of "flipping" by 90 degrees of the collective magnetization vector.

According to FIG. 2, the initial orientation of the magnetic momenta is random for the nuclei in the background state (aligned with the field with Boltzmann equilibrium distribution describing the population of the energy levels). The only net magnetization component is the difference between the populations of the background and the excited states, with the predominant population in the background state (spin polarization). The upper position in FIG. 2 describes this stage. Upon sensing the RF pulse, the system gains energy by the alignment of the magnetic momenta in the same phase (lower entropy state, middle position). This phase coherence is a general property of resonance absorbance. For example, all mechanical pendulums experiencing resonance by the same external force are also expected to swing in the same phase. Also, the proportion of the energy levels changes due to the quantum transition to the excited states, corresponding to flipping some of the spins shown in the lowest position of the figure. The resulting "flipped" collective magnetic vector is the original collective magnetic vector turned by 90 degrees. In this orientation the net magnetic flux of the sample gyrates in the contour of the RF coils with the Larmor frequency, producing the maximal initial post-flip signal current. The current represents the decaying oscillations which reflect dephasing and relaxation of the high-energy magnetized state after RF pulse is turned off. The signals are proportional to the square of the primary magnetic field and directly proportional to the molar percent of the resonating nuclei. The signals can also be deconvoluted as exponential decays with the relaxation times T1 and T2, providing the most useful information about the state of the system. T1 relaxation is the process by which the net magnetization (M) grows/returns to its initial maximum value (Mo) parallel to Bo in FIG. 2. Synonyms for T1 relaxation include longitudinal relaxation, thermal relaxation and spin-lattice relaxation. The net magnetization along Z is zero during the action of the RF pulse due to the M vector flip. The net magnetization returns back to its Boltzmann distribution maximum by the equation:

$$M_t = M_{max}(1-e^{-t/T1}) \qquad (12)$$

Where $M_t$ is the magnetization at time=t, the time after the 90° pulse, $M_{max}$ is the maximum magnetization at full recovery. This type of relaxation was termed "spin-lattice" due to lattice or other external environments being the acceptors of the excessive energy in the magnetized material.

As the individual magnetization vectors align with the primary magnetic field, they simultaneously de-cohere since the completely random orientation of the precessions are more favourable energetically as a more probable state with higher entropy. T2 relaxation is the process by which the transverse components of magnetization (Mxy) decay or dephase. T2 relaxation is considered to follow first-order kinetics, resulting in a simple exponential decay (like a radioisotope) with time constant T2. Thus, T2 is the time required for the transverse magnetization to fall to approximately 37% (1/e) of its initial value. Synonyms for T2 relaxation are transverse relaxation and spin-spin relaxation (See Bloch F. Nuclear induction. *Phys Rev* 1946; 70:460-474, 1946, incorporated herein by reference in entirety). T2 relaxation occurs whenever there is T1 relaxation. Some additional processes also exist (such as static local fields and spin "flip-flops") that cause T2 relaxation without affecting T1. T2 relaxation always proceeds at a faster rate than T1 relaxation.

Figure 3:
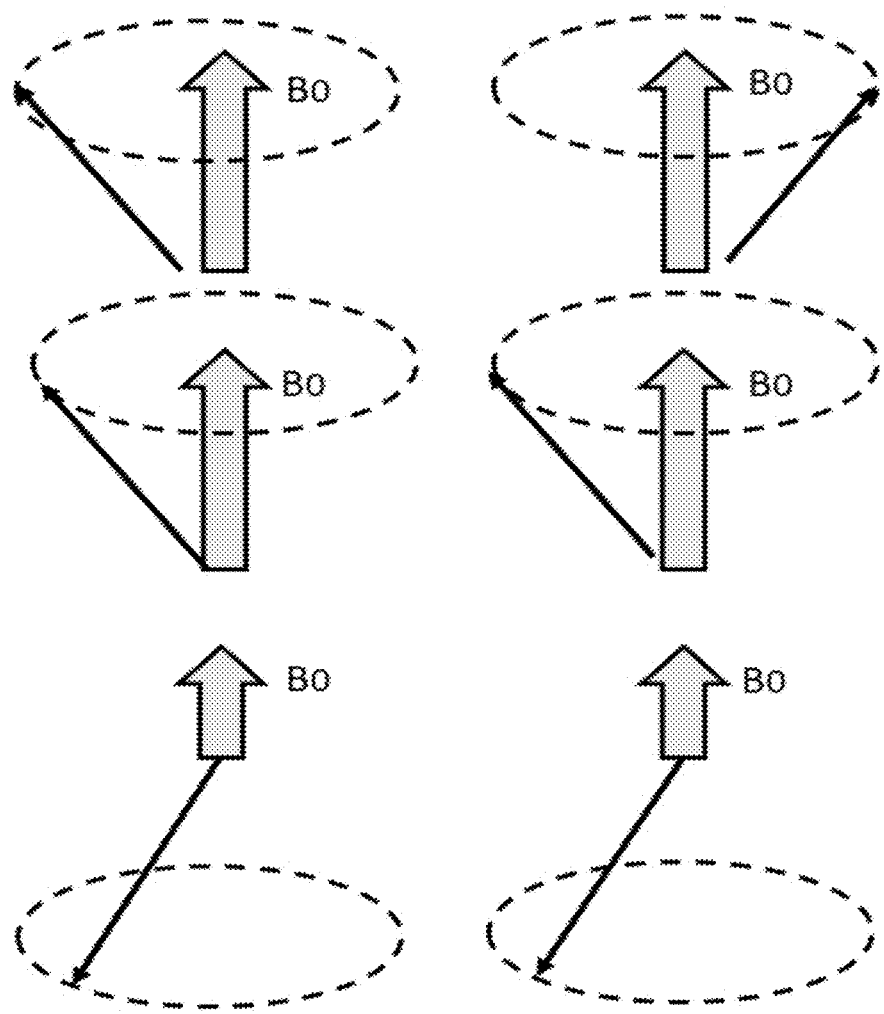
FIG. 3: The scheme of 180 degree flipping and synchronization for the global magnetization vector.
Figure 4A:
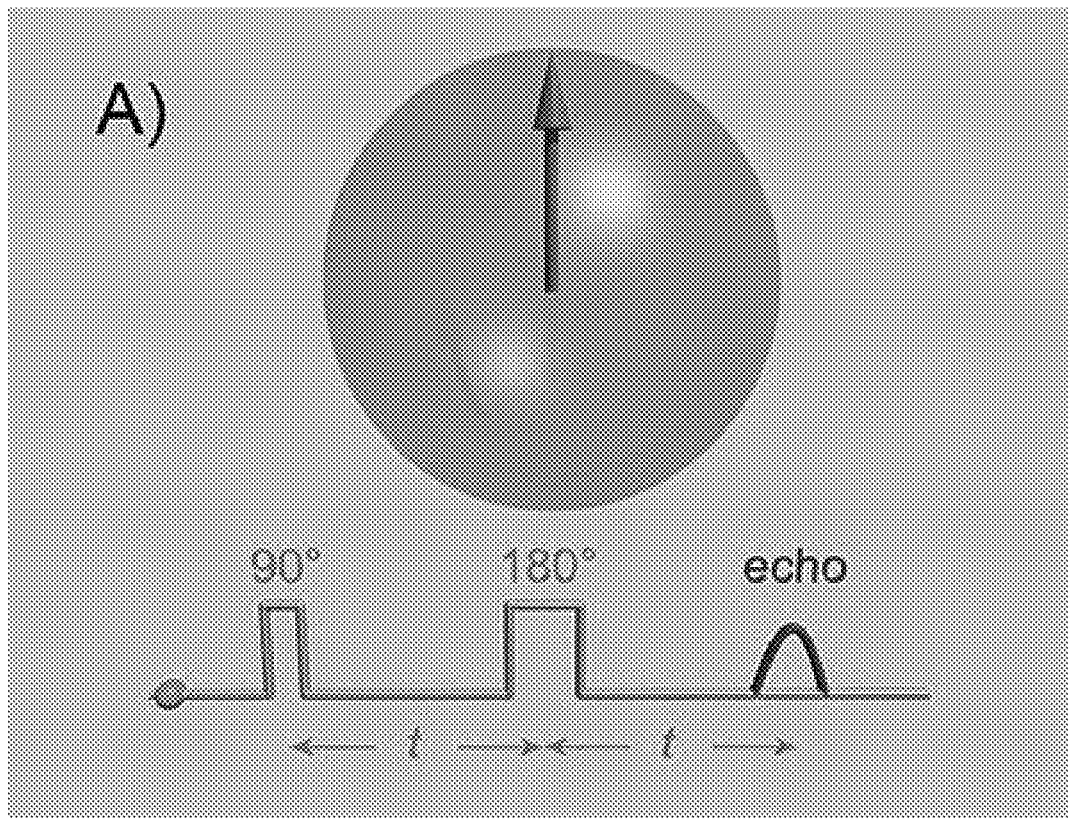
FIG. 4A. The initial orientation of the magnetization vector up-field.
Figure 4B:
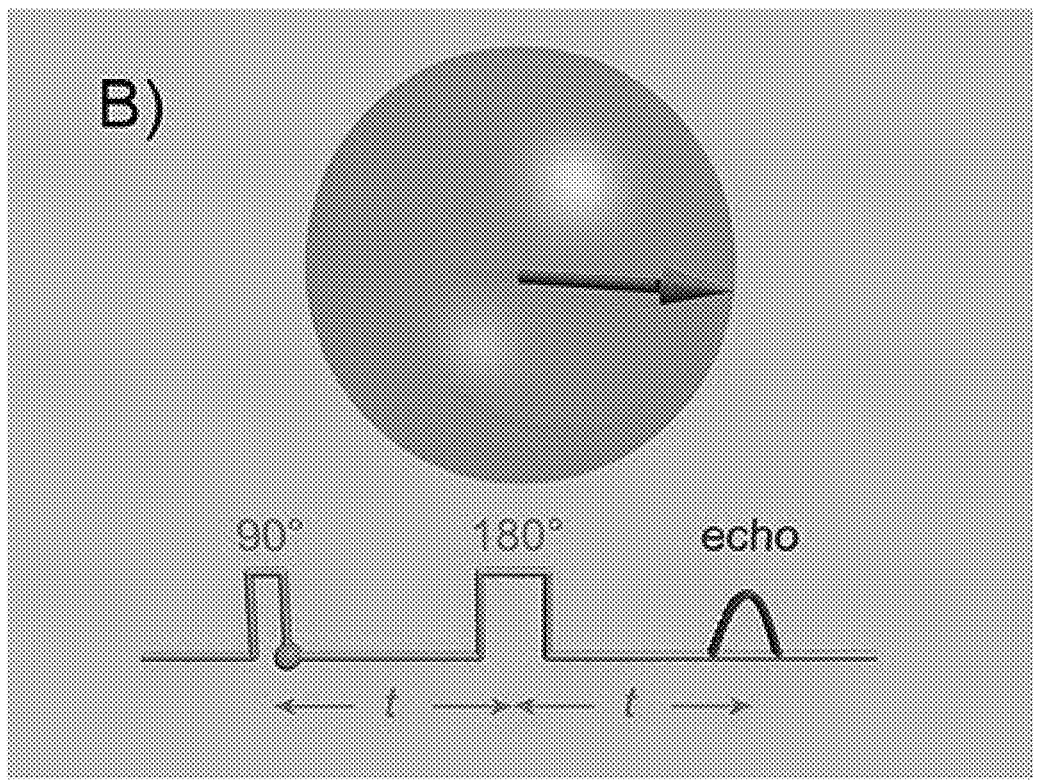
FIG. 4B. The initial focusing after the completion of 90 degree "flip".
Figure 4C:
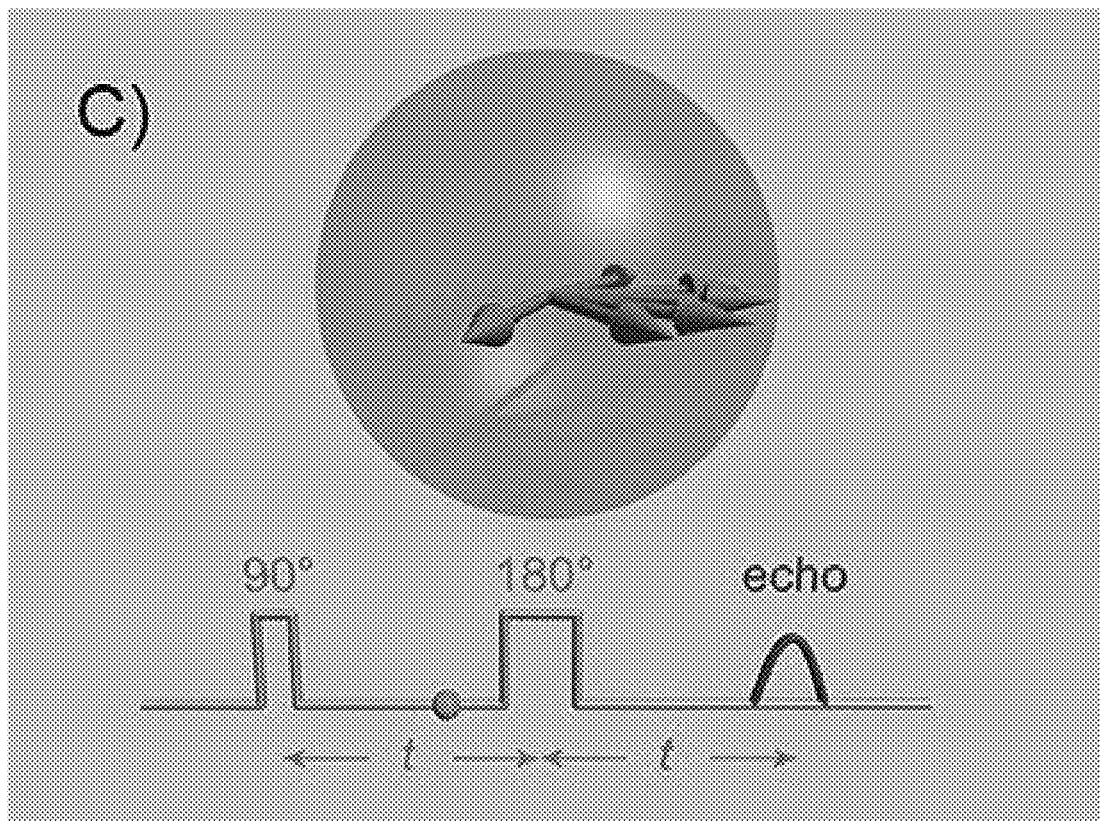
FIG. 4C. Relaxation of spins post 90-degrees focusing. Faster elements lose coherence first, while the lagging remains focused.
Figure 4D:
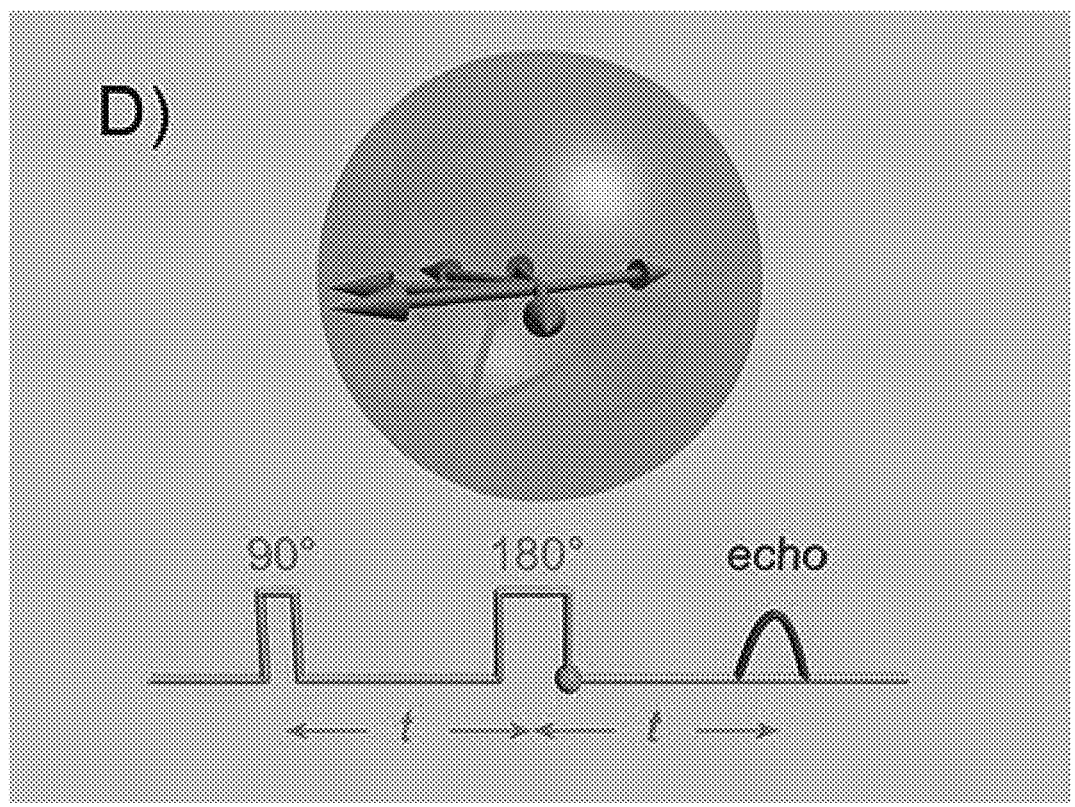
FIG. 4D. After RF irradiation from the opposite direction the former invisible elements (in 4C) become leading, face the detector coil and produce a signal. The former visible elements become lagging and are invisible.
Figure 4E:
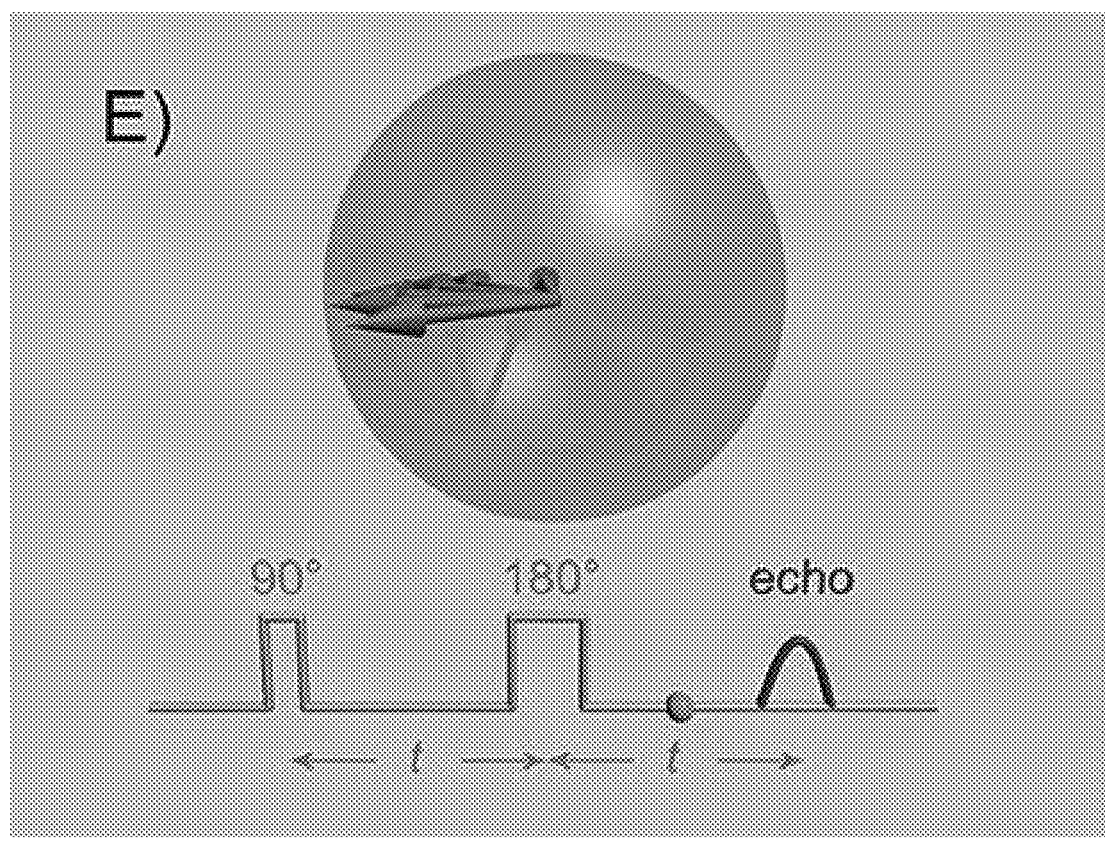
FIG. 4E. From the initial 90 degree "flip" of FIGS. 4B and 4C, the global vector first turns by 90 degrees vs. 4B and 4C (or 180 degrees vs 4A) and next additional 90 degrees, arriving at the arrangement as shown. After disconnection of RF energy, the individual magnetization vector continues synchronizing in the global transverse magnetization field M (as they do in $B_0$ in 4A), reaching a refocusing point later in time.
Figure 4F:
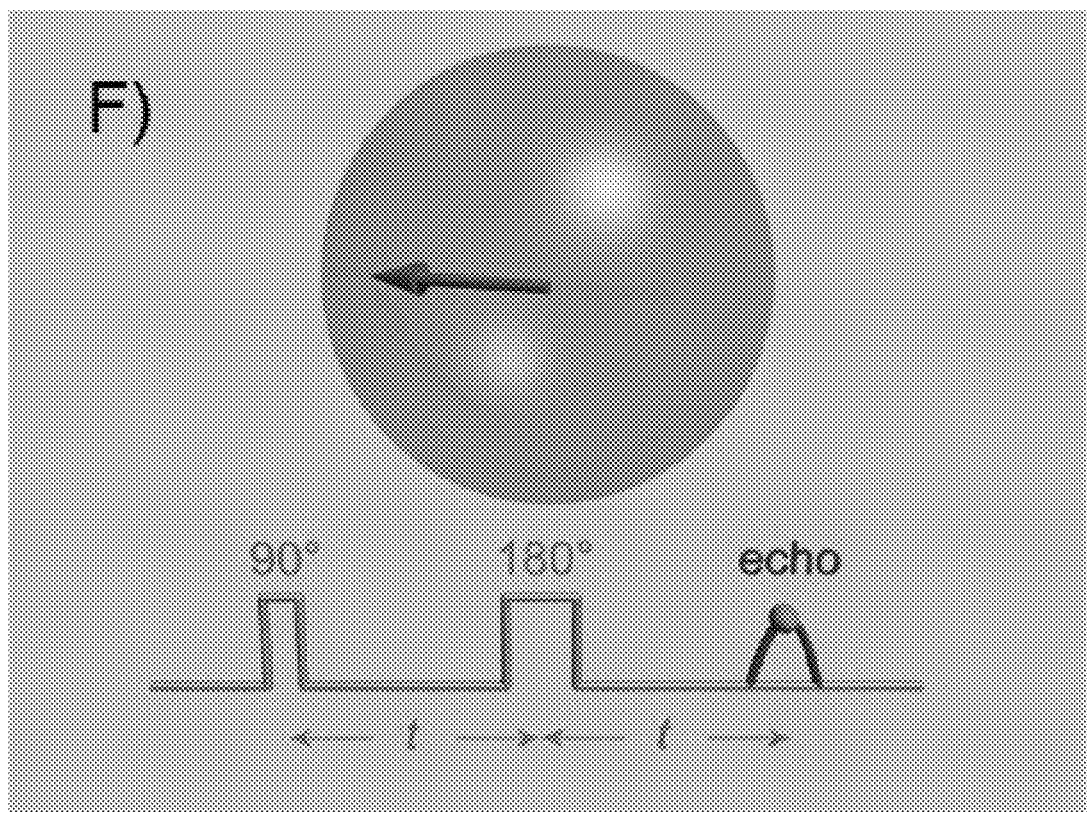
FIG. 4F. From the initial 90 degree "flip" of FIGS. 4B and 4C, the global vector first turns by 90 degrees vs. 4B and 4C (or 180 degrees vs 4A) and next additional 90 degrees, arriving at the arrangement as shown. The lagging elements continue to move in the transverse magnetic field M even when the RF energy is shut down, in the same sense as they converge in $B_0$ field in 4A. The field M acts more on the lagging elements and less on the leading elements, contributing to focusing of the signal in phase, observing "echo", even when RF is turned off.

FIG. 3 presents vector diagrams of the individual nuclei explaining acquisition of the 180 "flip angle" in the collective magnetization state. Such "flip" angles require twice as much energy absorbed by the sample from the RF pulse, due to either longer duration or higher intensity of the excitation pulsing. If in case of 90 degree "flip", the individual magnetization vectors are coherent and 50% are in the excited state (producing transverse orientation of the global vector, see FIG. 2), in case of 180 degree "flip" 100% of the individual nuclei are in the excited state. Upon reaching the exact 180 "flip", no transverse precession of the global magnetization vector takes place and the receiving RF coil detects no signal. Only after relaxation begins, the global magnetization vector begins to approach the 90 degree "flip" angle when the signal is maximized before it begins to decay. Simultaneously with the T1 relaxation, decoherence and T2 relaxation takes place all the way from the 180 degree "flip" to the final "flip" state (see below). The 180 degree regime produces more complex relaxation patterns and communicates qualitatively different information supplementing the lower degree regimes. In any real NMR experiment, however, the transverse magnetization decays much faster than would be predicted by natural atomic and molecular mechanisms; this rate is denoted T2* ("T2-star"). T2* can be considered an "observed" or "effective" T2, whereas the first T2 can be considered the "natural" or "true" T2 of the formation being imaged. T2* is always less than or equal to T2. T2* results principally from inhomogeneities in the main magnetic field. These inhomogeneities may be the result of intrinsic defects in the magnet itself or from susceptibility-induced field distortions produced by the formation or other materials placed within the field.

The 180 degree "flips" can be measured not only vs. the original up-field orientation of the magnetization vector but vs. the initial 90 degree "flip" in the sophisticated "spin echo" sequences of the present invention. FIG. 4A-F demonstrates such an interpretation of the 180 degree "flip".

Ideally, in each voxel of the apparatus space, all points should experience the same magnetic field and the same synchronized resonance conditions. However, inhomogeneity of the main magnetic field ("shimming"), local field shielding at some nuclei by valence electrons, different kinetics of re-orientation create a distribution of resonance frequencies. Some individual nuclei experience the spin "flip" earlier at lower delivered energy, some proceed together with the population average and some lag behind requiring a greater RF energy inputs to "flip". As a result, not all components participate in formation of NMR signal, since some "overshoot" the transverse spin orientation in the plane X0Y that is a prerequisite for signal detection, while the others remain in the original Z-axis aligned orientation. Thus, the information about the properties of these components remains unavailable, and the overall analysis becomes incomplete.

The application of saturating levels of RF energy leading to the 180 degree "flips" and "spin echo" phenomena addresses these problems (See Malcolm H. Levitt; Ray Freeman "NMR population inversion using a composite pulse". *Journal of Magnetic Resonance*, 1979, 33 (2): 473-476; Carr, H. Y.; Purcell, E. M. "Effects of Diffusion on Free Precession in Nuclear Magnetic Resonance Experiments". *Physical Review*, 1954, 94 (3): 630-638; Hahn, E. L. "Spin echoes". *Physical Review*, 1950, 80 (4): 580-594, incorporated herein by reference in entirety). The sequence of vector diagrams illustrating the individual and collective magnetization is provided in FIGS. 4A-4F, representing still images from the animation of a Hahn echo. The red arrows can be thought of as the individual spins. Applying the first pulse rotates the spins by 90 degrees, producing an equal superposition of spin up and spin down (FIG. 2). The spins subsequently "spread out" because each is in a slightly different environment. This spreading out looks like decoherence, but it can be refocused by a second pulse which rotates the spins by 180 degrees. Several simplifications are used in this animation: no decoherence is included, and each spin experiences perfect pulses during which the environment provides no spreading. The individual spins continue focusing after disconnection of RF excitation because the surviving global transverse magnetization persists for several dozen or hundred milliseconds and the lagging individual elements experience the greatest focusing force, being perpendicular to the transverse magnetization vector M.

Figure 5:
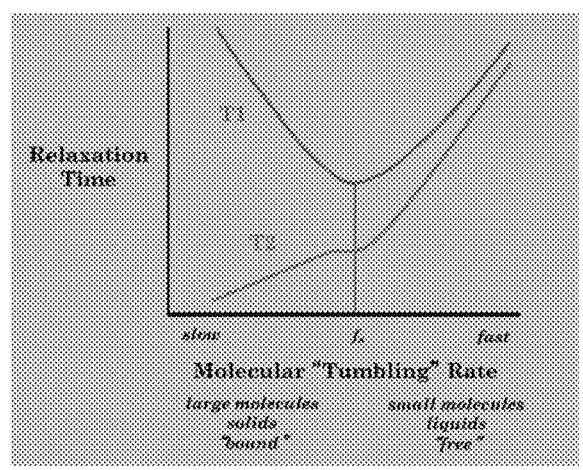
FIG. 5. Dependence of relaxation times T1 and T2 on the chemical nature, free vs. bound status and molecular weight of the molecules in the magnetized environment.

FIG. 5 presents a qualitative diagram and quantitative data comparing $T_1$ and $T_2$ relaxation times in different materials, as a function of the bound vs. free character of the protons and as a function of the molecular masses of each spin-bearing moiety. FIG. 5 illustrates that $T_1$ and $T_2$ are the longest for freely moving molecules of smaller mass, but $T_1$ passes through a minimum and begins to increase again for macromolecules, polymers and nanoparticles. $T_2$ is always shorter than $T_1$ and is especially short for solid-phase or bound species, also demonstrating a much broader dynamic range, thus indicating why $T_2$ is the parameters of choice for assessing the condition of hydrocarbon-bearing formation activated by aqueous acidic emulsion. Both $T_1$ and $T_2$ are shorter for hydrocarbons vs. free water.

Rationalizing of these trends is possible recalling that the detected NMR signal is produced by an ensemble of the flipped spin precessions, rotating in the transverse X0Y plane in the same phase (a necessary simplification). This assembly stores the energy absorbed from the RF pulse in the two major forms: (a) decreased entropy component by maintaining phase coherence and (b) orientation of the magnetic momenta perpendicularly to the acting base field $B_0$. This accumulated excessive potential energy of the ensemble is transferred to the environment, and the efficiency of energy transfer determines the duration of the relaxation period.

The precession movements represent a form of oscillations, and if the elements of the environment also oscillate with the same natural frequency as the precession frequency, the energy transfer becomes very efficient, by the same reason as NMR excitation becoming efficient when the external RF energy has the same period of oscillations. In case of relaxation, it is the oriented molecule in the collective magnetic field that plays the role of the external source and the molecules of the environment may or may not provide resonance absorbance, rapidly depleting the excessive energy of the ensemble. In free water, the own natural rotational frequency ("tumbling rate") exceeds the typical Larmor precession frequencies by orders of magnitude. Thus, the energy transfer is ineffective, and the relaxation times can be 3-5 seconds long for both $T_1$ and $T_2$. Hydrocarbons represent heavier molecules than water with slower "tumbling rate" producing more efficient energy transfer and dissipation for both $T_1$ and $T_2$. Polymers are too slow, and once they acquire transverse magnetization, the passage of energy becomes inefficient due to the "tumbling rate" (own rotation frequency) of the entire molecules becoming much slower than the precession rate of the nuclei within them. Thus, $T_1$ increases. Due to a very larger number of degrees of freedom, maintaining of precession phase coherence in large molecules requires a very large entropy constraint which is not a probable state. Thus, the magnetizations in these particles decohere rapidly even if the entire molecules do not re-orient rapidly along Z-axis, leading to the shortened $T_2$ at longer $T_1$. In ice, re-orientation of the magnetization vector in parallel to Z axis is hindered by the participation of the water molecules in close order crystal structure, leading to the "tumbling rates" much slower than the nuclear precession frequency and therefore high $T_1$. An ice crystallite can be considered as a polymer-like structure in which maintaining magnetization phase coherence would require large entropy constrain and therefore decohering is energetically favorable, producing short $T_2$ and long $T_1$.

Pore walls provide charged sites, hydrogen bonds, orbital acceptor sites and hydrophobic patches to the solution interactors. Water on the pore side complexing these active sites is immobilized one the wall and moving such a molecule to a different position requires activation energy comparable to the entire ensemble of its interactions. The next layer is partially immobilized due to increased intramolecular assistance effect of the directly immobilized water, acting similarly to chelators on the next layer. This effect subsides toward the center of the pore but is substantial over several molecular diameters. In case of hydrophobic molecules on hydrophobic surfaces, Van-der-Waals interaction between the immobilized first layer and the next layer is also strengthened by intramolecular assistance of the bound first layer. The effect similarly to the water case dwindles toward the center of the pore but can persist. The greater activation energy of self-diffusion in the boundary layers produces higher viscosities, lower rotational rates and more efficient $T_2$ dissipation of magnetization energy in the near-wall regions, decreasing relaxation times for both water and hydrocarbons. Carr-Purcell-Meiboom-Gill (CPMG) pulse train sequence is a non-limiting example of the radiofrequency pulse sequences and it is the one most suitable for $T_2$ measurements (discussed further below)

$T_2$ is an important parameter obtained from NMR measurements and it is a function of pore size distribution (surface relaxation), fluid type (diffusion relaxation) and fluid viscosity (bulk relaxation) as shown in equation (13). For the bulk fluid, there is no surface relaxation effect, so the only relaxations are bulk and diffusion:

$$\frac{1}{T_2} = \frac{1}{T_{2,bulk}} + \frac{1}{T_{2,surface}} + \frac{1}{T_{2,diffusion}} = \frac{1}{T_{2,bulk}} + \frac{\rho A_S}{V_p S} + \frac{1}{12}\gamma^2 G^2 T_E^2 D^2 \quad (13)$$

The condition (13) is energy balance for a pore, since the relaxation time reciprocals indicate the rate of magnetization energy loss in a unit volume.

$T_{2, bulk}$—is the relaxation time in the bulk fluid;
$T_{2, surface}$—is the relaxation time on the pore walls;
$T_{2, diffusion}$—is the relaxation time, associated with the loss of $T_2$ magnetization component by diffusion.

Applying CPMG pulse sequences reduces the field inhomogeneity so the relaxation from diffusion is negligible so the last term in equation (13) is cancelled as shown in equation (14).

$$\frac{1}{T_2} = \frac{1}{T_{2,bulk}} + \frac{1}{T_{2,surface}} = \frac{1}{T_{2,bulk}} + \frac{\rho A_S}{V_p S} \quad (14)$$

Wherein:
$A_s$—is the pore surface;
$V_{pS}$—is the pore volume;
$\rho$—is the pore wall relaxivity, the amount of magnetization energy scattering per a unit of pore surface.

Examining (14) shows that the sum of bulk and pore surface relaxation losses characterizes magnetization decay in pores. If the $T_2$ surface effect is significant, the fluid strongly interacts with the walls to ensure the formation of the high viscosity structured surface layer. By contrast, if there is no interaction with the wall, the tumbling rate of the molecules in the pores is close or identical to that in the bulk.

Figure 6A:
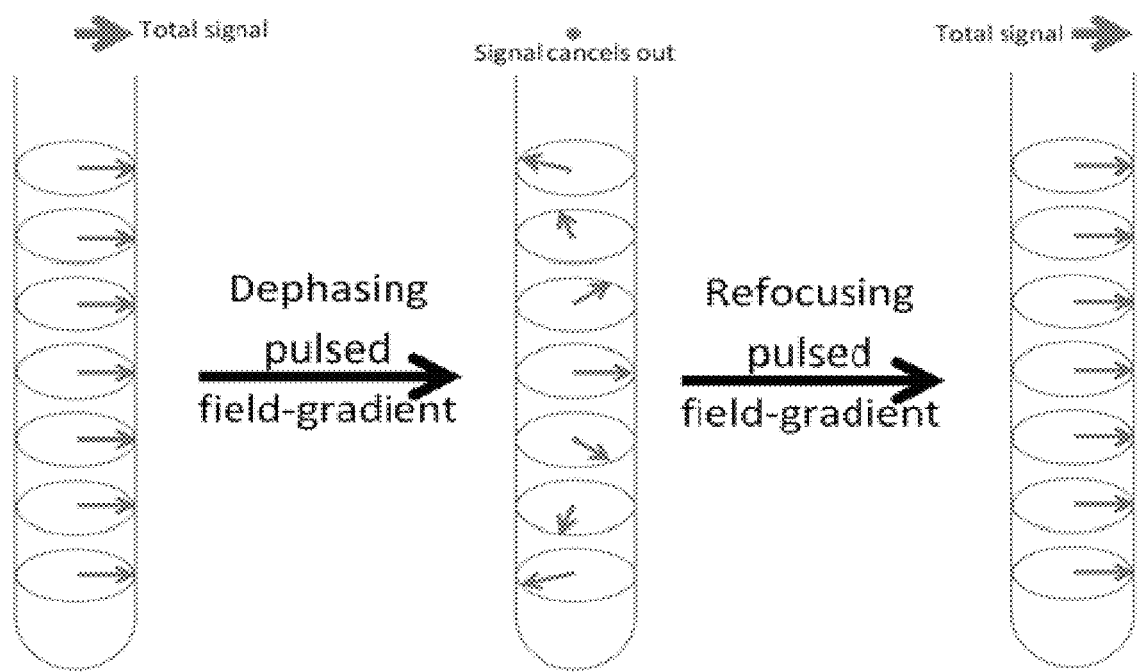
FIG. 6A: General scheme of PGSE (pulse field gradient echo) for measuring molecular diffusion.
Figure 6B:
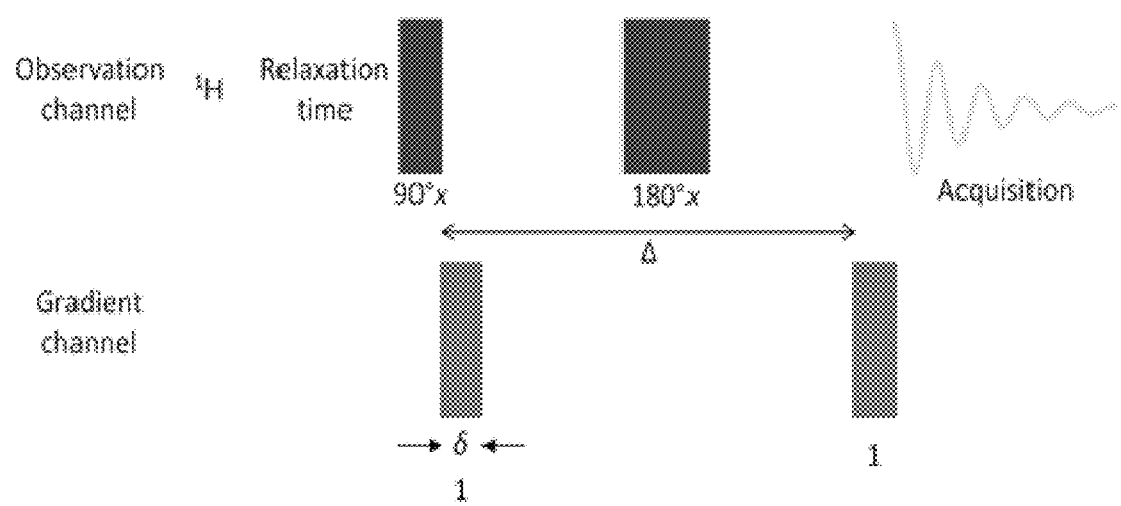
FIG. 6B: The relation of RF and magnetic gradient pulses in the diffusional measurements.
Figure 6C:
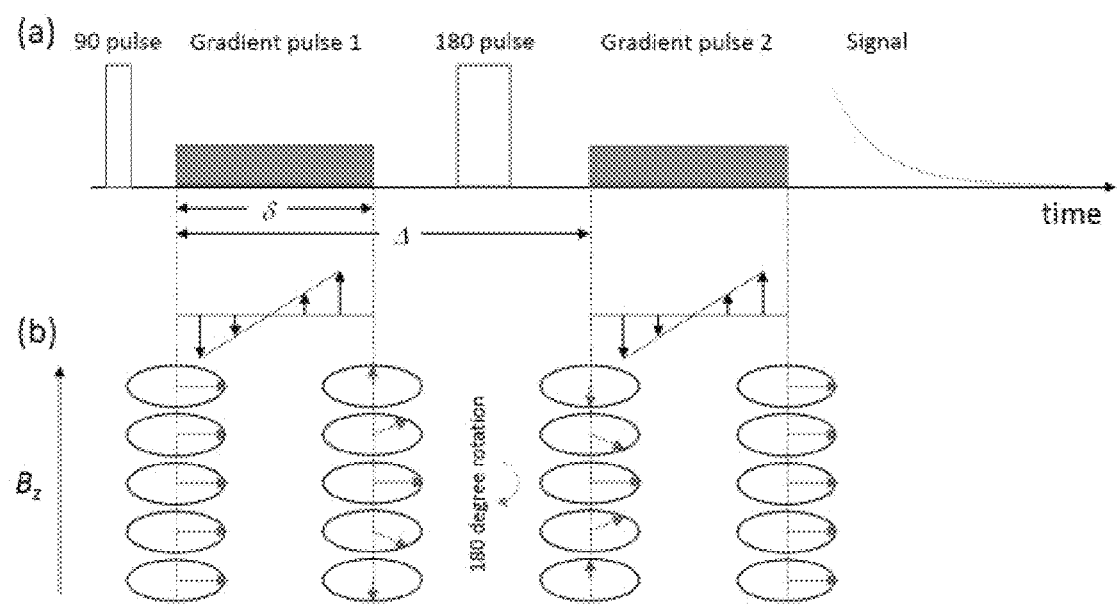
FIG. 6C: Development of decoherence and the subsequent re-focusing in the nuclei assembly as a function of RF pulses (hollow rectangular vertical bars) and magnetic gradient pulses (blue rectangular horizontal bars).

FIGS. 6A-D illustrate the principles of diffusion NMR with a magnetic pulse gradient. As shown in FIG. 6A, the magnetization vector is already 90 degrees "flipped" by the RF pulse, producing a detectable signal in the transverse detector coil. The precession movement of the nuclei is synchronized in the resonance transition. The term "dephasing pulse-field gradient" refers to the gradient of the magnetic field generated by the gradient magnetic coils (FIG. 1), to be differentiated from the RF pulse generated by RF coils. The imposition of different B values in the analyzed volume by the magnetic gradient pulse leads to different precession frequencies and therefore decoheres the initial magnetized environment post 90 degree "flip". No signal can be detected, since the global magnetization vector becomes zero. "Refocusing pulse field gradient" re-orients the nuclei that were in phase after the 90 degree "flip" and restores the signal in the detector, however, the diffusion of the species out of the volume that communicates with the detector coil diminishes the restored signal. Thus, the difference between signals before and after the sequence cycle provides the basis for estimating the diffusion coefficients. FIG. 6B illustrates the refocusing aspect. After a period of Δ/2 a 180° radiofrequency pulse inverts the dispersed magnetization such that after a period of Δ the magnetization is the negative of what it was following the gradient pulse. At this point, a second gradient pulse is applied to refocus the signal. The refocusing develops due to two contributions: one is the 180 degree "flip" counted vs. the initial 90 degree "flip" as typical in echo sequences and accomplished by an RF pulse (blue upper signals in FIG. 6B). The magnetization focusing by this mechanism was disclosed above. The second mechanism is the reversal of the magnetic pulse (the second pulse of the magnetic gradient), shown in red in FIG. 6B. The phase diagram in FIG. 6C illustrates the interaction between the 180-degree RF pulse and the second magnetic gradient pulse. The FIG. 6C clarifies that the individual magnetic momenta of the nuclei that lag behind the neighbors or overtake them in terms of precession movement return to the previous position after the 180 degree RF and the second magnetic gradient pulse (inverted vs. the first gradient pulse), restoring the coherence and allowing to observe the signal. The PGSE sequence leads to identification and diffusion coefficient measurement for the diverse species, including acidic protons, including, without limiting 2H and 3H substitutions (see below).

In PGSE in the case of self-diffusion of molecules, the normalized signal amplitude E/E0 decays as a Gaussian curve with increasing magnetic gradient pulse amplitude G:

$$\frac{S(TE)}{S_0} = \exp\left[-\gamma^2 G^2 \delta^2 \left(\Delta - \frac{\delta}{3}\right)D\right] \quad (15)$$

where $S_0$ is the signal intensity without the diffusion weighting, S (TE) is the signal with the magnetic field gradient, γ is the gyromagnetic ratio, G is the strength of the gradient pulse, δ is the duration of the pulse, Δ is the time between the two pulses, and finally, D is the diffusion coefficient.

Figure 6D:
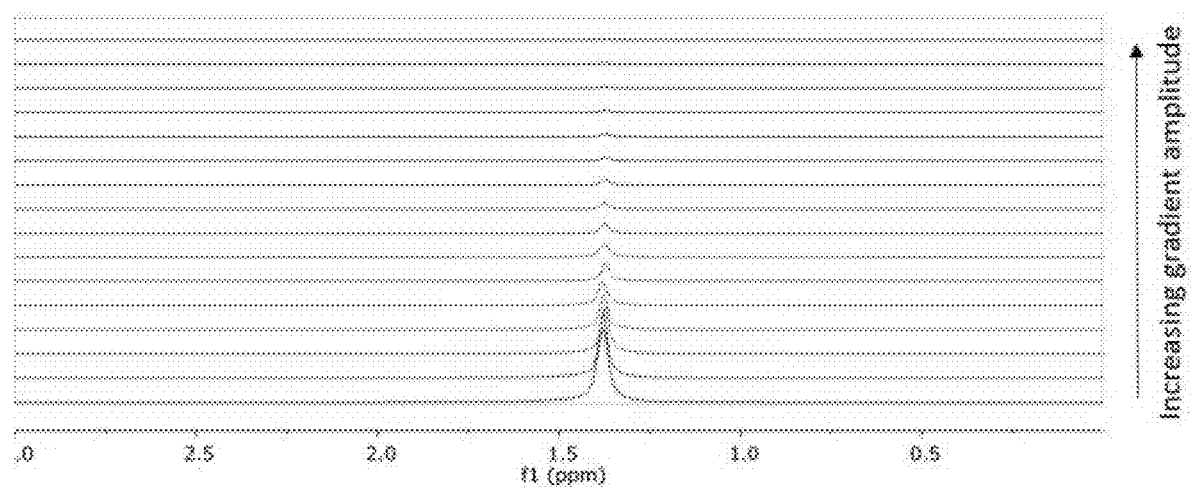
FIG. 6D: Accumulation of data points in the diffusion measurements by NMR.

FIG. 6D shows the stacked experiment, where the strength of the residual signal S(TE) is plotted as a function of the magnetic field gradient G. The FIG. 6D illustrates how the resonance signal emerges at the resonance RF frequency f1 and how the signal decreases in the serial measurements as a function of dephasing magnetic gradient pulse.

In a preferred embodiment, the apparatus and software support partial flip angles with the more rapid accumulation of multiple data points to produce logarithmic plots. The plots are linear in the coordinates [ln S(TE)/S0=k G²] where the coefficient k includes the diffusion coefficient and the cycle pulse parameters. The rate of data point accumulation is important to increase the signal-to-noise ratio, which may be high in the NMR method of diffusion measurement due to high propagated error. In this embodiment, the partial flip angles range from 10 to 85 degrees without reaching the 90 degrees, which is achievable by softer RF pulses. The increased rate of data acquisition is achievable under these conditions due to shorter periods of magnetization energy accumulation and relaxation. In addition, partial flip angles alleviate the limitations on sensitivity that arise from the quantum-mechanical nature of the phenomenon. For quantum states separated by energy equivalent to radio frequencies, thermal energy from the environment causes the populations of the states to be close to equal. Since incoming radiation is equally likely to cause stimulated emission (a transition from the upper to the lower state) as absorption, the NMR effect depends on an excess of nuclei in the lower states. Several factors can reduce sensitivity, including increasing temperature, which evens out the population of states.

Conversely, low-temperature NMR can sometimes yield better results than room-temperature NMR, providing the sample remains liquid. Saturation of the sample with energy applied at the resonant radiofrequency (complete flip angles, 90 degrees or above) is another sensitivity-reducing factor. This manifests in both constant wave (CW) and pulsed NMR. In the first case (CW) this happens by using too much continuous power that keeps the upper spin levels completely populated. In the second case (pulsed), each pulse (that is at least a 90° pulse) leaves the sample saturated, and four to five times the (longitudinal) relaxation time (5T1) must pass before the next pulse or pulse sequence can be applied. For single pulse experiments, shorter RF pulses that tip the magnetization by less than 90° can be used, which loses some intensity of the signal, but allows for shorter recycle delays. The optimum "flip" angle is called an Ernst angle. The relaxation times for the protons in free water are relatively short, but in the drilling conditions, nanoparticles and hydrocarbon-based aggregates contribute slowly relaxing components, and the use of partial angles can be advantageous.

Figure 7:
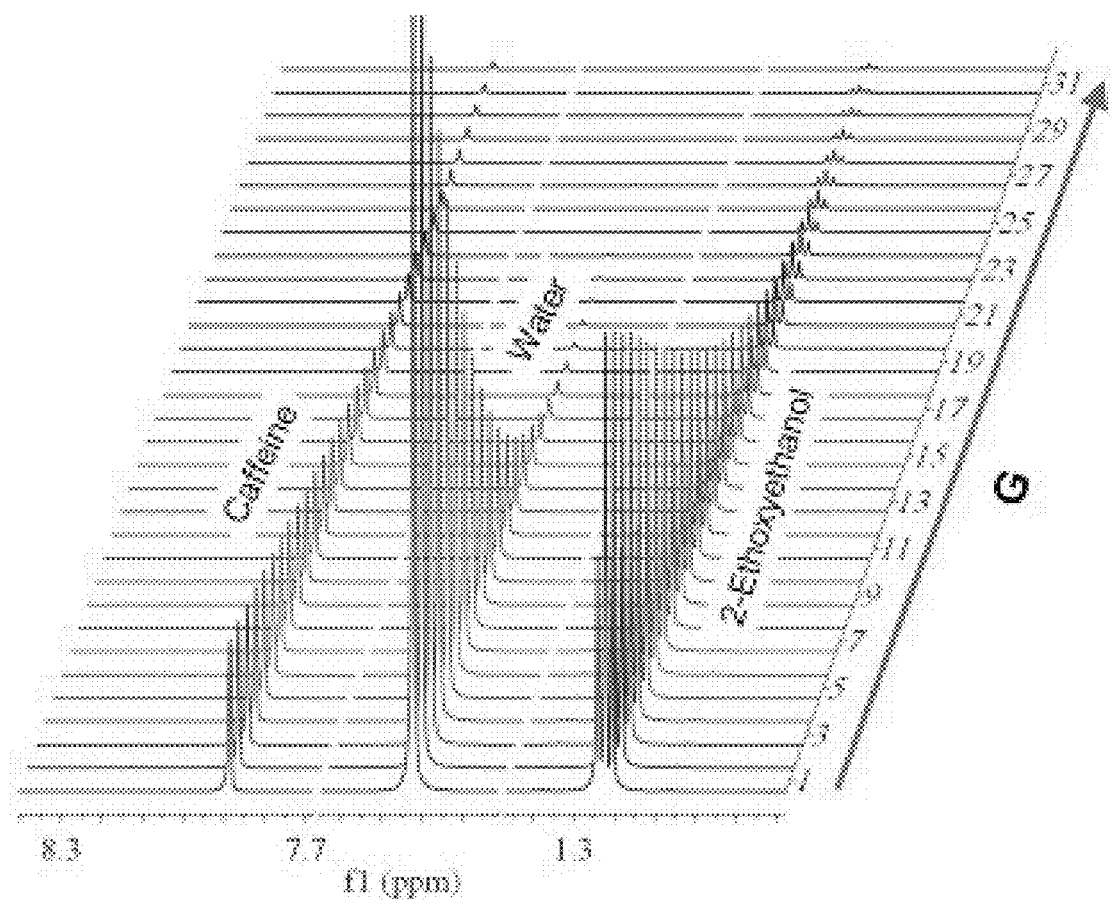
FIG. 7: Diffusion ordering spectroscopy NMR (general scheme).
Figure 8A:
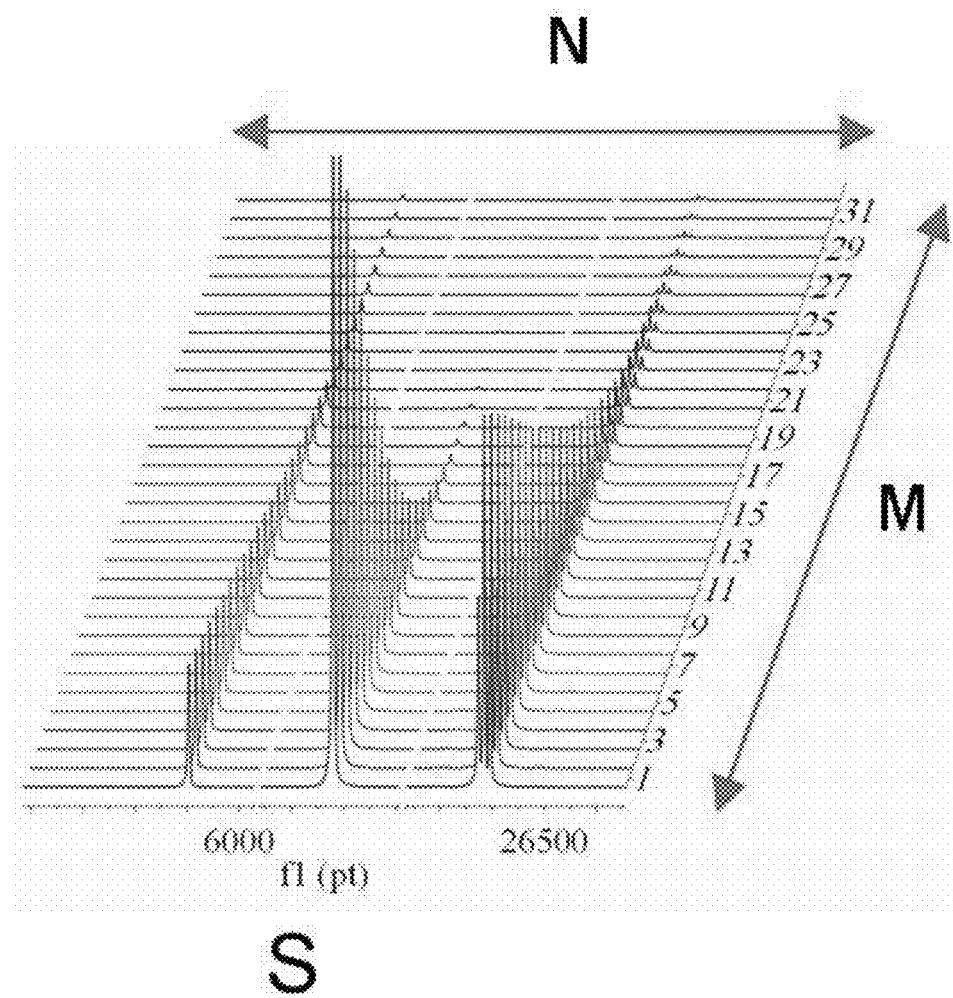
FIG. 8A: Transformation of the fl-G data into DOSY data. The primary data: the axis S corresponds to the chemical shifts, the axis M corresponds to the intensity of magnetic pulse gradient. Different species show different rate of extinction.
Figure 8B:
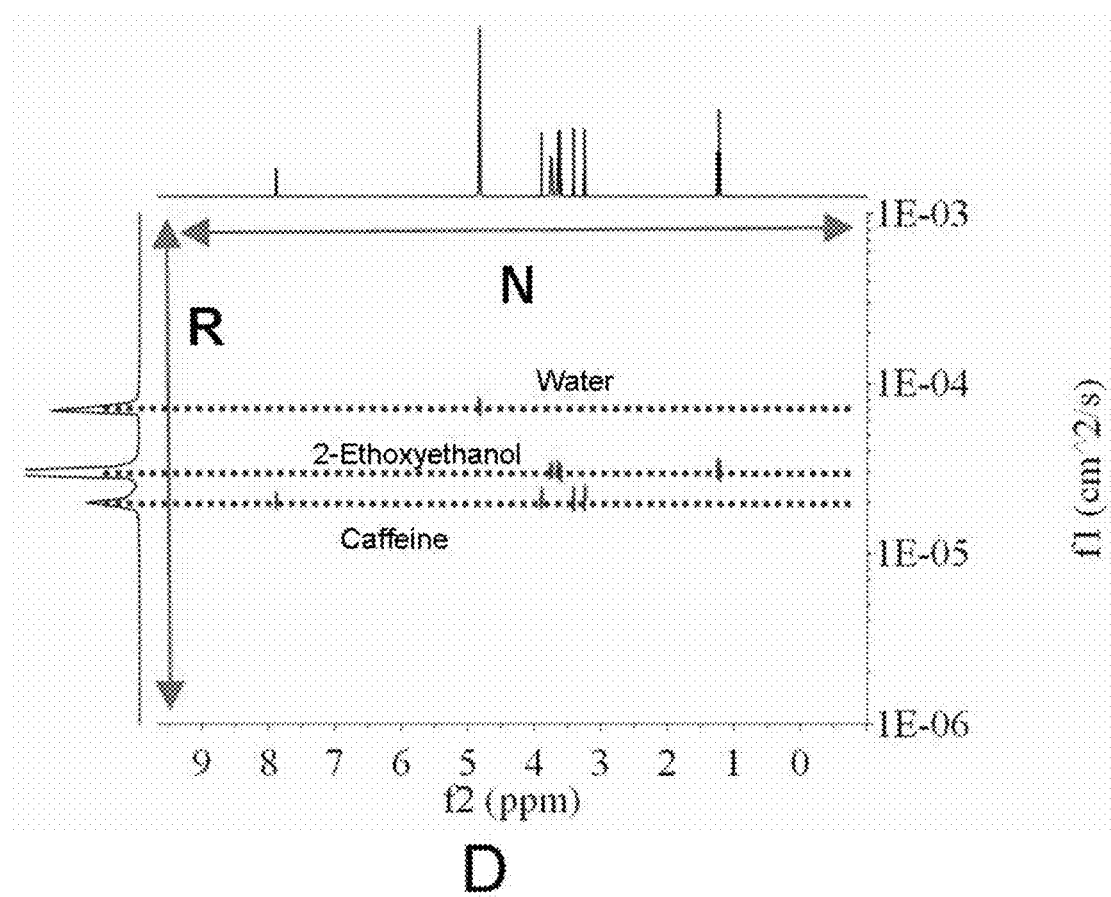
FIG. 8B: Transformation of the fl-G data into DOSY data. The data 8A are reorganized. The axis D corresponds to the chemical shifts, the axis fl corresponds to the intensity of magnetic pulse gradient.

In another preferred embodiment, multiple diffusion coefficients are simultaneously measured in combination by pulsed NMR, with the device and software supportive of data generation and analysis. FIG. 7 presents Diffusion-Ordering Spectroscopy NMR (DOSY). The figure presents a 2D plot with the abscissa being the chemical shifts and the ordinate being the magnitude of the magnetic gradient (See equation 13). The chemical species are identified by the shifts, and the decay of the signal is a function of magnetic gradient pulse strength G is plotted for each chemical shift. As far as data processing of raw PFG-NMR spectra is concerned, the goal is to transform the N×M data matrix S into an N×R matrix (2D DOSY spectrum) as shown in FIGS. 8A and 8B. The horizontal axis of the DOSY map D is identical to that of S and encodes the chemical shift of the nucleus observed (generally 1H). The vertical dimension, however, encodes the diffusion coefficient D. In the ideal case of non-overlapping component lines and no chemical exchange, the 2D peaks align themselves along horizontal lines, each corresponding to one sample component (molecule). The horizontal cut along such a line should show that the component's 'normal' spectrum of chemical shifts. Vertical cuts show the diffusion peaks at positions defining the corresponding diffusion constants. The mapping S=>D is called the DOSY transformation. This transformation is, unfortunately, far from straightforward. Practical implementations of the procedure include mono and biexponential fitting, Maximum Entropy, and multivariate methods such as DECRA 'Speedy Component Resolution' (See M. Nilsson and Gareth A. Morris in *Anal. Chem.*, 2008, 80, 3777-3782 incorporated herein by reference in entirety) as an improved variation of the Component Resolved (CORE) method (*J. Phys. Chem*, 1996, 100, 8180, incorporated herein by reference) providing a multivariate-based that shows an advantageous performance of the algorithm.

Figure 9:
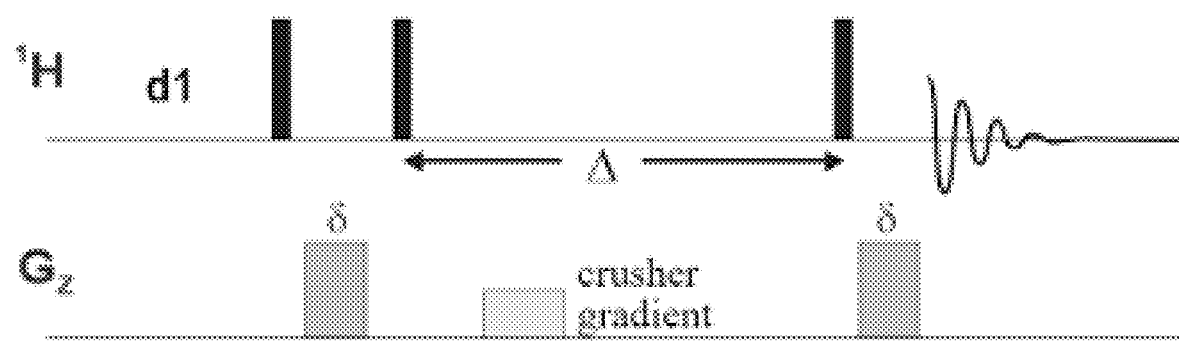
FIG. 9: A scheme of stimulated echo sequence (STE) NMR experiment.
Figure 10:
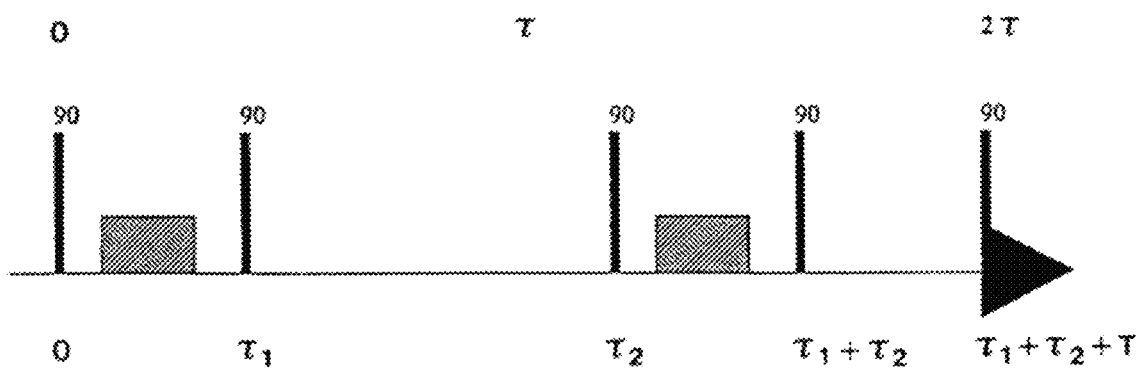
FIG. 10: A scheme of longitudinal encode-decode or "longitudinal eddy current delay" echo sequence NMR experiment.
Figure 11:
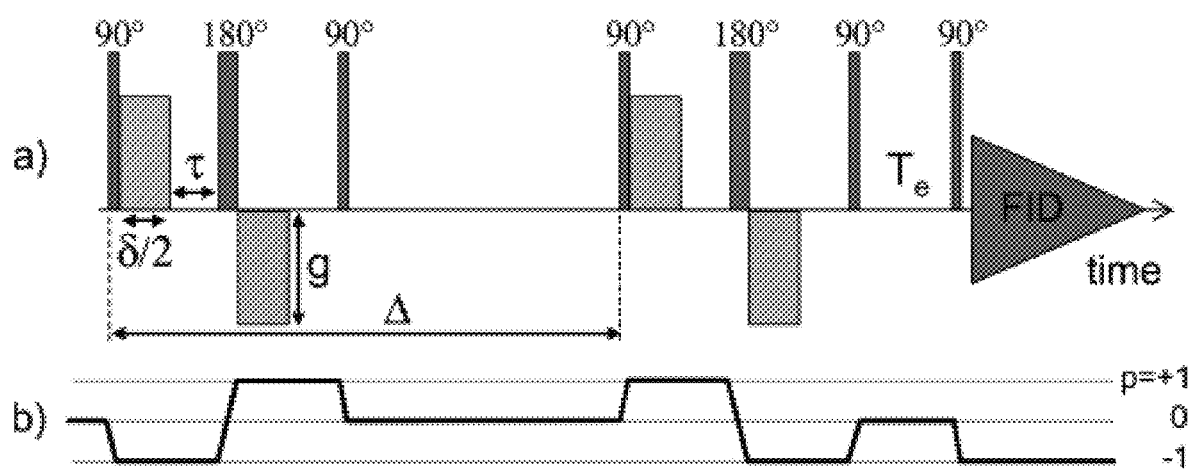
FIG. 11: Bipolar gradient longitudinal encode-decode BPP-LED pulse sequence NMR experiment.
Figure 12:
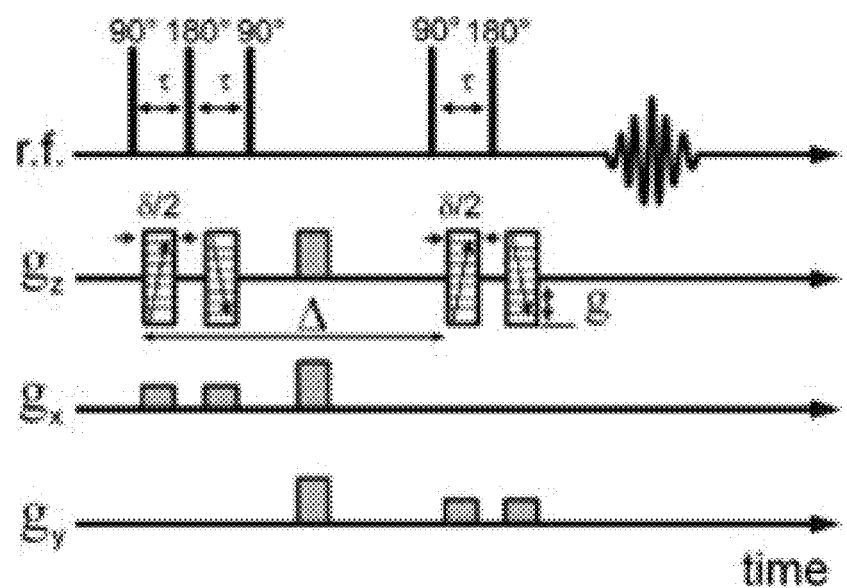
FIG. 12: Alternating Pulsed Field Gradient Stimulated Echo Nuclear Magnetic Resonance (APGSTE) sequence.

In another preferred embodiment, the apparatus and software support the additional sequences suitable for the diffusion coefficient measurements: the Hahn stimulated echo (STE) with pulsed field gradients (FIG. 9). The sequence is analogous to PGSE but differs by providing two 90 degrees RF pulses in place of one 180-degree RF pulse in PGSE and by insertion of an additional "crusher" magnetic gradient pulse step. The LED (longitudinal encode decode) pulse sequence used in the NMR diffusion experiments is shown in FIG. 10. The radiofrequency pulses are shown as filled vertical rectangles with the flip angles denoted above each pulse. The magnetic field gradient pulses are shown as hatched rectangles, and the data acquisition is indicated with a vertically hatched triangle. Bipolar gradient longitudinal encode-decode pulse sequence (BPP-LED) is shown in FIG. 11. The BPPLED method cancels the adverse effects of eddy currents using two gradient pulses with identical areas but different polarities. Other embodiments comprise, respectively, the gradient compensated stimulated spin-echo pulse sequences (GCSTE), the double stimulated echo sequence (DSTE), the STE-INEPT pulse sequences for heteronuclear detected DOSY with coherence transfer, shuttle based fringe field 2D-DOSY, and the Alternating Pulsed Field Gradient Stimulated Echo Nuclear Magnetic Resonance (APGSTE) sequence (FIG. 12) without limiting. The APGSTE sequence is especially preferred for analyzing anisotropic diffusional systems, such as hydrocarbon-bearing formations with anisotropic porosity and tortuosity distributions. The sequence comprises focusing and de-coherence by the series of magnetic gradient pulses in 3 dimensions, explaining its unique suitability for more realistic modelling of diffusional coefficient tensors. All sequences lead to processing and data collection/transform by the DOSY methodology, with the Tanner and Stejskal equation modified for each specific sequence (See Jan Hrabe, Gurjinder Kaur, and David N. Guilfoyle, "Principles and limitations of NMR diffusion measurements" in *J Med Phys.*, 2007 January-March; 32(1): 34-42; Davy Sinnaeve, "The Stejskal-Tanner Equation Generalized for Any Gradient Shape—An Overview of Most Pulse Sequences Measuring Free Diffusion" in *Concepts in Magnetic Resonance Part A*, 2012, Vol. 40A(2) 39-65, incorporated herein by reference in entirety).

Figure 13:
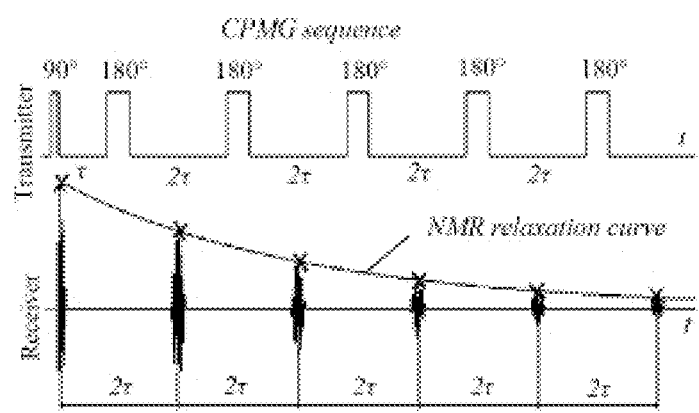
FIG. 13: Carr-Purcell-Meiboom-Gill (CPMG) pulse train sequence.

CPMG is a nuclear magnetic resonance (NMR) measurement, referring to the cycle of radiofrequency pulses designed by Carr, Purcell, Meiboom and Gill to produce pulse echoes and counteract dephasing due to magnetic field inhomogeneities (FIG. 13). In the CPMG sequence, an initial radiofrequency pulse is applied long enough to tip the protons into a plane perpendicular to the static magnetic field (the 90° pulse). Initially the protons precess in unison, producing a large signal in the antenna, but then quickly dephase due to the inhomogeneities. Another pulse is applied, long enough to reverse their direction of precession (the 180° pulse) and causing them to come back in phase again after a short time. Being in phase, they produce another strong signal called an echo. They quickly dephase again but can be rephased by another 180° pulse. Rephasing is repeated many times, while measuring the magnitude of each echo. This magnitude decreases with time due to molecular relaxation mechanisms surface, bulk and diffusion. One measurement typically may comprise many hundreds of echoes, while the time between each echo (the echo spacing) is of the order of 1 ms or less. In this regime, the diffusional component of relaxation is suppressed (See: Carr H Y and Purcell E M: Effects of Diffusion on Free Precession in Nuclear Magnetic Resonance Experiments, Physical Review 94, no. 3 (1954): 630-638. Meiboom S and Gill D: Modified Spin-Echo Method for Measuring Nuclear Relaxation Times. The Review of Scientific Instruments 29, no. 8 (1958): 688-691; incorporated herein by reference in entirety).

Having considered the physical basis of the NMR methodologies, pertinent to the inventive method, the most preferred embodiments are presented in more detail. In a preferred embodiment, the method of the present disclosure is intended to be a rapid bridging laboratory procedure, establishing correlation with the benchmark Amott-Harvey approach and purely in-situ downhole measurements. The method of the present disclosure comprises saturation of the sample by oil, which may not be feasible in a borehole. The depth of drilling is in the range 0.5-5 km, while the borehole diameter is 0.12-1 m. However, the rapid and precise NMR procedure of the present disclosure can be used in a field laboratory to recalibrate for multiple secondary NMR methods which are compatible with the in-situ downhole applications. Such secondary methods offer the benefits of scale, precise positional address, measurement in depth from the borehole edge, measurement in dynamics by flooding at variable pressures, measurements in dynamics by including surfactants, simultaneous measurement of multiple signals, including NMR, conductance and sonic sources. The log data are massive, mutually supportive, amenable to machine learning analysis and sharing with multiple commercial packages. But they need validation by a reliable benchmark method or its faster and more convenient NMR proxy.

Figure 14:
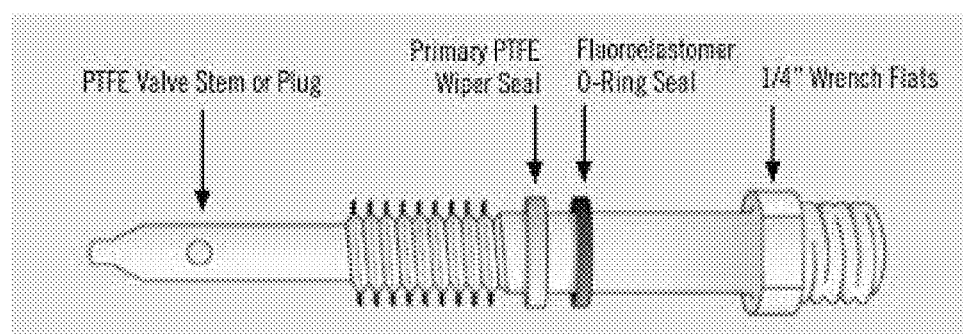
FIG. 14: High-pressure valved NMR sample tubes by Norrel.

At its laboratory stage, the method is implemented as a kit, preferably with equipment, reagents, instructions and software, designed to complete one measurement within 20 minutes of sample delivery. The samples are delivered from a recorded vertical section of the well. The samples upon arrival are rinsed in brine, broken into small fragments 3-5 mm in diameter and loaded into a high-pressure NMR tube under a layer of brine. The suitable tubes are represented, without limitation, by: Extreme Series Valved NMR Sample Tubes from NORELL® (FIG. 14), High Pressure NMR tubes by Daedalus Innovations, 5 mm Heavy Wall Precision Pressure/Vacuum Valve NMR Sample Tube 7" by Wilmad Lab Glass. Other components of the kit include the protective screens while operating high pressure NMR tubes (up to 10 atm), buffers and brine, standardized oil, supply of pressurized nitrogen to force brine and oil in the sample at the respective stages of the test, gloves and goggles. In operation, the test tube is loaded by the rock fragments under the layer of brine, closed and pressurized. The brine invades the pores. The bulk brine $T_2$ is measured. The test tube is extracted from the device, opened, decanted and the rock sample is rinsed by oil. The oil layer tops the fragments, and the test tube is pressurized again until water becomes irreducible (practically—up to 10 atm, below the 13 atm limit for the test tubes). The $T_2$ values are measured for oil in the bulk, oil in the pores and irreducible water in the pores. Next, the test-tubes are opened, the oil is decanted by a thin vacuum-connected pipette and the brine is returned to expel oil under the pressure. The $T_2$ values are measured for the bulk brine, brine in the pores after expelling oil, and the residual non-reducible oil. The combined results enable computing the wettability index of the present method. The wettability index computed for several samples is compared with the secondary metrics that are suitable for downhole use establishing a correlation with the inventive method. The secondary metrics are described further and the NMR-based information required to compute them is derived while processing the samples by the inventive calibration method.

The secondary in-situ methods rely on submersible equipment, compatible with downhole regimes. The Measuring While Drilling (MWD) alternatives to sample extraction, delivery to a laboratory and application of the results to the process upon completion of the laboratory study are advantageous (See Prammer, M. G., Drack, E., Goodman, G. et al. The Magnetic-Resonance While-Drilling Tool: Theory and Operation. *SPE Res Eval & Eng*, 2001, 4 (4): 270-275. SPE-72495-PA; Appel, M., Radcliffe, N.J., Aadireddy, P. et al. Nuclear Magnetic Resonance While Drilling in the U.K. Southern North Sea. Presented at the *SPE Annual Technical Conference and Exhibition, San Antonio, Tex., USA,* 2002, 29 September-2 October. SPE-77395-PA; Morley, J., Heidler, R., Horkowitz, J. et al. Field Testing of a New Nuclear Magnetic Resonance Logging-While-Drilling Tool. *Presented at the SPE Annual Technical Conference and Exhibition, San Antonio, Tex., USA,* 2002, 29 September-2 October. SPE-77477-MS; Poitzsch, M., Scheibal, J. R., Hashem, M. et al. Applications of a New Magnetic Resonance Logging-While-Drilling Tool in a Gulf of Mexico Deepwater Development Project. Presented at the SPWLA 43rd Annual Logging Symposium, Oiso, Japan, 2002, 2-5 June. SPWLA-2002-EEE; Heidler, R., Morriss, C., and Hoshun, R. 2003. Design and Implementation of a New Magnetic Resonance Tool for the While Drilling Environment. *Presented at the SPWLA 44th Annual Logging Symposium, Galveston, Tex.*, USA, 2002, 22-25 June. SPWLA-2003-BBB; Borghi, M., Porrera, F., Lyne, A. et al. Magnetic Resonance While Drilling Streamlines Reservoir Evaluation. *Presented at the SPWLA 46th Annual Logging Symposium, New Orleans,* 2005, 26-29 June. Paper 2005-HHH).

In one embodiment, the method relies on the commercially available drilling assemblies incorporating NMR apparatus among other sensors for providing the real-time multifactorial feedback. The non-limiting examples are Pro-Vision Plus (magnetic resonance while drilling apparatus by Schlumberger). The apparatus and the software acquires the $T_2$ data derived from pore size and fluid properties within several seconds, the $T_2$ data can be further processed to quantify bound- and free-fluid volume and capillary-bound water. MR signal decay data helps ascertain permeability, producible porosity, and irreducible water saturation as well as capillary pressure curves, hydrocarbon identification, and facies analysis. A real-time permeability log enables predicting production rates to optimize completion and stimulation programs.

Analogously, Halliburton Sperry Drilling apparatus and software offers logging-while-drilling (LWD) nuclear magnetic resonance (NMR) source-less porosity solutions to help gain insight into the key petrophysical properties of the reservoir through a mineralogy-independent porosity assessment. The apparatus (MRIL®-WD™ Magnetic Resonance Imaging Logging-While-Drilling Sensor) determine the total porosity of a reservoir, movable fluid volume, capillary bound fluid volume, and micro-porosity—essential information to allow a user to determine which fluids produce hydrocarbons upon stimulation. By calculating a qualitative estimate of permeability, the user identifies which reservoir intervals have greater flows, and can better target the optimal spots for increased production.

Other providers of the small-diameter borehole-adapted NMR apparatuses comprise Mount Sopris Instruments, Baker Hughes Incorporated tools, Dart, Javelin, and Javelin Wireline tools by VISTA-CLARA INC without limitation. These and the additional MRWD (magnetic resonance while drilling) designs are disclosed in U.S. Ser. No. 10/197,698, U.S. Ser. No. 10/401,313, U.S. Ser. No. 10/473,600, U.S. Ser. No. 10/295,627, U.S. Ser. No. 10/338,267, US20190033483, U.S. Ser. No. 10/191,178 incorporated herein by reference in entirety.

In a preferred embodiment, the NMR device can function both as a submerged device and as the main analytical tool in a field laboratory. It is provided with a software fitting relaxation, chemical shifts, signal intensity, diffusivity data extracted at different time-points and lengths of sequences to the geometry, composition and wettability of the pores. In a preferred embodiment, the software provides decision support pointing to the optimal vertical position in the borehole, suitable as a perforation node (branching point) for the secondary channels originating from the primary cased vertical well, where the inventive method is applied.

In one preferred non-limiting embodiment of a secondary wettability in-situ metric, the software quantitates the presence of hydrocarbon in the formation as a function of water flooding. If hydrocarbon does not compete with water for the affinity to the pore surface, the decline in the intensity of the signals resonating at hydrocarbon chemical shift frequencies is sharp after flooding. The decline decreases if there is competition and the pore surface is amphiphilic. The decline is minimal if hydrocarbon is absorbed by the pore surfaces tightly and outcompetes water for the wall affinity sites. These profiles can be calibrated by the inventive method which in turn, correlates strongly to the benchmark test. The quantitative expression of the metric is [change of hydrocarbon signal]/[initial hydrocarbon signal×flooding pressure].

In another preferred non-limiting embodiment, the secondary metric is the ratio of: [irreducible water]/[porosity× tortuosity/pore diameter]. The expression reflects the ratio of the irreducible water and inner pore surface. If the interaction with the pore wall material is strong (water wetted), the number of molecular layers retained per a unit of pore surface is high and can be correlated to Amott-Avery test via the inventive bridging NMR test. All required components are identifiable by several variations each (See: Chang D, Vinegar H J, Morriss C, Straley C. Effective porosity, producible fluid and permeability in carbonates from NMR logging. In SPWLA 35th Annual Logging Symposium 1994 Jan. 1. Society of Petrophysicists and Well-Log Analysts; Gao H, Li H. Determination of movable fluid percentage and movable fluid porosity in ultra-low permeability sandstone using nuclear magnetic resonance (NMR) technique. Journal of Petroleum Science and Engineering. 2015 Sep. 1; 133: 258-67; Anferova S, Anferov V, Rata D G, Blumich B, Arnold J, Clauser C, Blumler P, Raich H. A mobile NMR device for measurements of porosity and pore size distributions of drilled core samples. Concepts in Magnetic Resonance Part B: Magnetic Resonance Engineering: An Educational Journal. 2004 October; 23(1):26-32; Prammer M G. NMR pore size distributions and permeability at the well site. In SPE annual technical conference and exhibition 1994 Jan. 1. Society of Petroleum Engineers; Strange J H, Webber J B. Spatially resolved pore size distributions by NMR. Measurement Science and Technology. 1997 May; 8(5):555; Pape H, Tillich J E, Holz M. Pore geometry of sandstone derived from pulsed field gradient NMR. Journal of Applied Geophysics. 2006 Mar. 1; 58(3):232-52; Zecca M, Vogt S J, Connolly P R, May E F, Johns M L. NMR measurements of tortuosity in partially saturated porous media. Transport in Porous Media. 2018 Nov. 1; 125(2):271-88; Tourell M C, Pop I A, Brown L J, Brown R C, Pileio G. Singlet-assisted diffusion-NMR (SAD-NMR): redefining the limits when measuring tortuosity in porous media. Physical Chemistry Chemical Physics. 2018; 20(20):13705-13; Xiao L, Mao Z Q, Jin Y. Calculation of irreducible water saturation (S wirr) from NMR logs in tight gas sands. Applied Magnetic Resonance. 2012 Feb. 1; 42(1):113-25; Xuan D, Fu S, Xie R. Study on NMR logging bulk volume of the irreducible water model. Nuclear Electronics and Detection Technology. 2007; 27(3):578-82; Fleury M, Deflandre F. Quantitative evaluation of porous media wettability using NMR relaxometry. Magnetic resonance imaging. 2003 Apr. 1; 21(3-4):385-7; incorporated herein by reference in entirety). Most typically, porosities are estimated based on signal intensity of the fluid expected to be in the pores, tortuosity is estimated by restricted diffusion, pore size distribution by $T_2$ distribution, and irreducible water in the presence of oil by the combination of $T_1$ and $T_2$ of the surface components.

In a further preferred non-limiting embodiment, the secondary metric is the ratio of hydrocarbon and water in the larger pores to the content in the smaller pores. The rationale for this measurement is the unequal distribution between the wetted surface and the bulk of pore. In case of smaller pores, the surface to volume ratio is greater and the more wetting component may develop a bulk concentration gradient between the pore categories, following the surface affinity. The gradient of signal with the given chemical shift is corroborated by greater T2 and restricted diffusion shifts between the pores of different size.

In a still further preferred secondary measurement, the NMR logging is accompanied by conductivity logging. In a more water-wetting environment, the conductivity is higher at the same brine-to-oil saturation ratio. The rationale for this trend is spreading of the water phase, maximized in a wetting environment at the same opposing content of oil. In a non-wetting situation, the injected brine forms isolated drops and the conductance of hydrocarbon is lower by orders of magnitude. At a certain extent of formation flooding by the brine, the continuous phase forms even in a non-wetting environment, but at lower saturations, the differences can be dramatic. Measuring conductance in depth before and after flooding and having the drilling chippings available for the calibration study by the inventive method allows to align the vertical profile of in-depth conductance pre- and post-flooding and the "true" wettability data. Typically, the amount of drilling mud intended for cooling the drilling assembly is several cubic meters and it fills the region of drilling operation only, with the rest of the well emerging empty. After covering a significant stretch of depth, a steel casing pipe is inserted and the annulus between the pipe and the well wall is fortified by concrete. The measurements should precede this strengthening step. Due to the limited volume of mud that follows the drilling assembly, this volume of mud represents the composition of the rocks in the proximity to the current drilling region and therefore can be delivered to the surface and aligned with NMR and conductance logging data. The samples delivered to the field laboratory for processing by the inventive method are labeled by the vertical position of the drilling assembly and can be attributed to the depth with a minimal error (mostly arising from the perfect mixing regime and the presence of the material from the other depth levels).

In another preferred embodiment, the secondary metrics are the wettability estimates of the commercially available software, validated by the field laboratory employing the inventive method. The non-limiting examples of the commercially available log-interpreting software are: Core analysis software CYDAR™ (CYDAREX), PerGeos package, ECLIPSE 100 or 300/500 reservoir simulation software, ECLIPSE Blackoil, RSTPro (Reservoir Saturation Tool) and WFL (Water Flow Log) by Schlumberger, GEMS by Computer Modelling Group, CMG Software Solutions by Computer Modelling Group. The packages are trained on dozens and hundreds of formation cores and field conditions, however, cannot anticipate all specific situations. The wettability and permeability are directly linked while also independently affect the productivity and yield of the reservoir. If the local conditions fall outside of the training method and its ability to extrapolate, the results are likely to skew the economic model, with significant cost consequences. There is a value in an independent inexpensive express validation of the predicted results using a portable field NMR device, accompanied by a rapid measurement kit. Re-testing a statistically viable (8-10) number of vertical sections by the inventive method validates the entire log interpretation and assures that the given reservoir falls in the range of predictability and extrapolation by the commercial software and the latter can be further used for the local situation. If the result is negative, the log data are imported into an alternative package and validation is repeated, until a correct commercial analytical software is identified.

In a further preferred embodiment, customized software is written for exploratory wells located in the same geographic region. The non-limiting examples of such broad regions are the Permian Basin, the Orinoco Oil Belt, the Guyana offshore region, the TX-LA-MS Salt Basin, The Western Gulf Basin, The Ft. Worth Basin, The Palo Duro Basin, The Anadarko Basin. Bound by a common geological history, the formations within such regions are more uniform as compared to variation between different global regions. While the outliers of petrophysical properties are possible, they are less likely and the economic models are more precise if a customized package replaces the commercial software. In this embodiment, the customized package is written by relating the metrics emulating log measurements (the secondary metrics) to a combination of laboratory calibrating metrics. Such a combination comprises the estimate of wettability by the inventive NMR method, measurement of permeability as the at least two levels of core brine flooding, measurement of conductivity at the at least two levels of core brine flooding, and measurement of tortuosity and porosity by the benchmarks. The primary (benchmark) and the secondary (log-imitating) measurements are performed on a library of the formation cores originating in the geographic region of interest. The first step in this methodology is reaching the collection of sandstones or carbonates cores. These categories of porous rocks are analyzed separately. Commercial providers manufacture and sell the cylindrical rock cores representing hydrocarbon reservoirs: Kocurek Industries INC., Vinci Technologies, Rockman, Bureau Veritas Commodities Canada Ltd. without limiting.

Core Research Center was established to coordinate these efforts and preserves valuable rock cores for scientists and educators from government, industry, and academia. Other core depositories include Alabama Geological Survey State Oil and Gas Board Core Warehouse, Alabama Geological Survey State Oil and Gas Board Core Warehouse, Alaska Geologic Materials Center, Alaska Geologic Materials Center Online Inventory, Arizona Geological Survey (AZGS) 1993 Core Repository Report, Arkansas Geological Survey Norman F. Williams Well Sample Library, California Well Sample Repository, Connecticut Geological Survey Bedrock Core Repository, Delaware Geological Survey Outer Continental Shelf Core and Sample Repository, Florida Geological Survey Core and Cuttings Repository, Illinois State Geological Survey Geological Samples Library, Search Illinois Geological Samples Library, Iowa Geological Survey Oakdale Rock Library and Research Facility, Kansas Geological Survey Kansas Core Library, Kansas Geological Survey Kansas Rotary-cutting samples, Kentucky Geological Survey Well Sample and Core Library, Well Sample and Core Library Database Search, LACCORE National Lacustrine Core Repository, Louisiana Geological Survey Resource Center Core Repository, Maine Geological Survey Core Repository and Exploration Records, Michigan Geological Repository for Research and Education, Minnesota Department of Natural Resources Division of Lands and Minerals Drill Core Library, Mississippi Department of Environmental Quality, Environmental Geology Division, Office of Geology, Core and Sample Library Missouri Department of Natural Resources McCracken Core Library and Research Center Nebraska Conservation and Survey Division Geological Sample Repository, Nevada Bureau of Mines and Geology Great Basin Science Sample and Records Library, New Mexico Subsurface Data and Core Libraries, North Carolina Geological Survey Coastal Plain Office Core Repository, North Dakota Geological Survey Wilson M. Laird Core and Sample Library, Ohio Department of Natural Resources Geological Survey Core and Sample Repository, Oklahoma Geological Survey Core and Well Cutting Research Facility, Pennsylvania Department of Conservation and Natural Resources (DCNR), South Carolina Geological Survey Core Repository, South Dakota Geological Survey Core and Cuttings Repository, Core and Cuttings Repository Database, Texas Bureau of Economic Geology Core Research Facilities, Integrated Core and Log Database, Utah Geological Survey Core Research Center, Wisconsin Geological & Natural History Survey Research Collections and Education Center (Core Repository).

The USGS maintains the most diverse public-access core collections in the USA. A variety of core sub-collections are available in the repository, including those from oil shale development; Eniwetok Atoll; Cajon Pass, Calif.; Yellowstone Park; and off-shore wells. In addition, CRC curates collections of cuttings (rock chips) brought to the surface during drilling operations. The core and cuttings collection is also accompanied by a large collection of thin sections, which are used to examine microscopic details of the rocks. Images of the thin sections and photographs of some cores are available for viewing and download. Files containing chemical and physical analyses, core descriptions, stratigraphic charts, and various other analyses performed by previous users of the collection can also be downloaded. The CRC houses about 2 million feet of core in the general collection of petroleum exploration and development holes as well as in specialized collections. These cores come from 33 states and about 95 percent were donated by petroleum and mining companies, State geological surveys, other Federal agencies, and universities; about 5 percent are special scientific cores drilled by the USGS. In addition, the CRC maintains over 25,000 thin sections taken from cataloged cores and cuttings. Cuttings from over 52,000 wells in 27 States are also housed at the repository. This unique collection of cuttings represents around 240 million feet of drilling at a replacement cost of over $80 billion. Analogous infrastructure exists outside of the USA, without limitation: Kochi Core Center Kochi University, Japan and the University of Bremen, Germany. The samples are available via an application process and released by a decision of a research board.

The cylindrical cores are sealed in a high-pressure testing cell and are subjected to permeability test using a fluid with known viscosity or with a viscosity profile emulating natural hydrocarbon (another sample of heavy oil, cracking residue, tar). Alternatively, gas permeability is measured. Prior to pressing through the core, the fluid (or gas) is equilibrated with water (or water vapor) and passes a pre-filter eliminating potential sediments (dust). The core is wetted by water to the extent matching the non-reducible level or to a fixed level of water content. The permeability test is repeated at 2 water saturation levels and with several oil (gas) models. After completion of the realistic permeability test, the wetted cores with the model hydrocarbons entrapped in the pores together with water are subjected to NMR, resistivity and sonic characterization. The NMR examination includes measuring overall signal strength at different chemical shifts, measuring of relaxation times for all components at different orientations of the sample, measuring water restricted diffusion coefficients, measuring diffusion anisotropy, computing porosity, pore size distribution and tortuosity based on NMR data. The core next undergoes resistivity studies at the initial and varied water contents, with the several directions of the current, to measure the anisotropy of formation factor, resistivity index and the empirical coefficients n and min Archie's Law form. The core also undergoes acoustic studies at several water contents and directions. After completing these tests, the core is repeatedly extracted by hot diesel oil (to prevent asphaltene deposition), the diesel oil is displaced and dissolved by heptane, and the core is dried. The dried core is subjected by a detailed porometric study and "true" tortuosity determination by xenon NMR or microscopy (See Wang R, Pavlin T, Rosen M S, Mair R W, Cory D G, Walsworth R L. Xenon NMR measurements of permeability and tortuosity in reservoir rocks. Magnetic resonance imaging. 2005 Feb. 1; 23(2):329-31; Albers B, Wilmanski K. Acoustics of two-component porous materials with anisotropic tortuosity. Continuum Mechanics and Thermodynamics. 2012 Nov. 1; 24(4-6):403-16; Wang R, Mair R W, Rosen M S, Cory D G, Walsworth R L. Simultaneous measurement of rock permeability and effective porosity using laser-polarized noble gas NMR. Physical Review E. 2004 Aug. 31; 70(2):026312; incorporated herein by reference in entirety). At some point, the core also undergoes the benchmark study by the present wettability-prediction method.

The procedure is repeated for multiple samples, separately for carbonates and sandstones. The number of samples included in the training set for each group is not less than 50, preferably 75, even more preferably >100. For each sample, multiple compositions are analyzed (water contents and oil models), thus the training set may include 1000-2000 data rows, relating the high-throughput logging parameters to the observed permeabilities (wettability, mechanical strengths). For cost-efficiency, the training sets are expected to be maximally diversified to ensure that they represent the entire variety of hydrocarbon cores within a basin (for example, the samples extracted in Arabian Basin).

At the next step, the parameters measured by high-throughput logging tools such as NMR, resistivity and acoustic probes are fit to the true values of wettability permeability, porosity and tortuosity obtained in careful laboratory experiments. Multiple fitting methods are possible, with multiple convergences and residual minimization criteria (the Least Square Method is one non-limiting embodiment). In one non-limiting embodiment, the following expression is fitted to the experimental wettability W measured by the inventive method:

$$A_1 \times [\tau_{NMR}^{B1}] \times [R^{B2}] \times [\Phi_{NMR}^{B3}] \times [(\tau_{NMRZ})^{B4}/(\tau_{NMRXY})^{B4}] \times S_w^{B5} \times S_{wir}^{B6} \times (\Delta H/H)^{B7} \times [D]^{B8} = W \quad (16)$$

Where:
- W—is dimensionless wettability index in the range (−1, 1),
- $A_1$—is the empirical proportionality factor,
- $[\tau_{NMR}^{B1}]$—is the diffusional tortuosity determined by NMR and B1 is the respective exponent of the fitting model to be determined in the training process.
- $[R^{B2}]$—is the relative resistivity at the given extent of brine flooding (related to the resistivity of pure brine) and B2 is the respective exponent of the fitting model to be determined in the training process.
- $[\Phi_{NMR}^{B3}]$—is the overall porosity determined by NMR and the respective fitting coefficient B3.
- $[(\tau_{NMRZ})^{B4}/(\tau_{NMRXY})^{B4}]$—is the ratio of diffusional tortuosity in the direction Z to one measured in the plane XY and the respective fitting coefficient B6.
- $S_w^{B5}$—is the water saturation fraction with the respective fitting factor.
- $S_{wir}^{B6}$—is the irreducible water content with the respective fitting factor.
- $(\Delta H/H)^{B7}$—is the fraction of hydrocarbon expelled from the sample at the given $S_w$, with the respective fitting factor.
- $(D)^{B8}$—is the weight-averaged diameter of the pores with the respective fitting factor.

All definitions above apply to water flooding the innermost 0-5 mm of the borehole wall, the closest to the drilling in progress.

The formula (16) effectively combines the secondary metrics defined earlier. It accounts for the dynamics of hydrocarbon expulsion per a unit of saturating brine pressure and volume, the changes in resistivity in response to the pressure and volume of the injected brine, the thickness of surface water layer measured by combining $[S_{wir}^{B6}]$, $[D^{B8}]$, $[\Phi_{NMR}^{B3}]$, $[\tau_{NMR}^{B1}]$ and $[(\tau_{NMRZ})^{B4}/(\tau_{NMRXY})^{B4}]$ as well as asymmetries in water and hydrocarbon distribution based on the pore size. The 9-coefficient metric is fitted to the inventive results and provides a reliable local estimate of wettability, which needs field laboratory validation less frequently than the commercial package, but still needs it occasionally.

Having generally described this disclosure, a further understanding can be obtained by reference to certain specific examples which are provided herein for purposes of illustration only and are not intended to be limiting unless otherwise specified.

EXAMPLE 1: ROCK SAMPLES

Figure 15A:
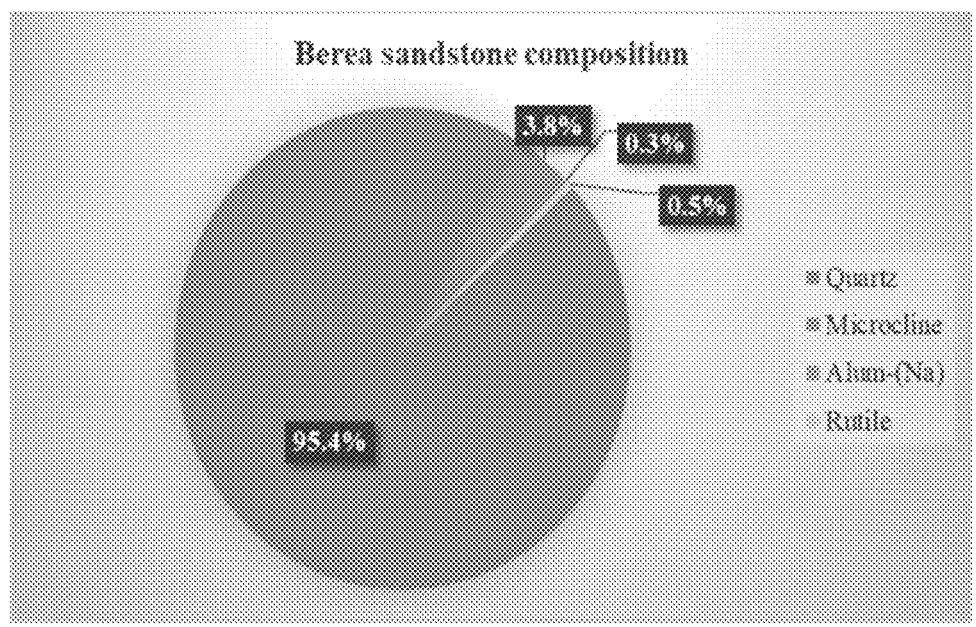
FIG. 15A: Mineral composition of Berea rock sample.
Figure 15B:
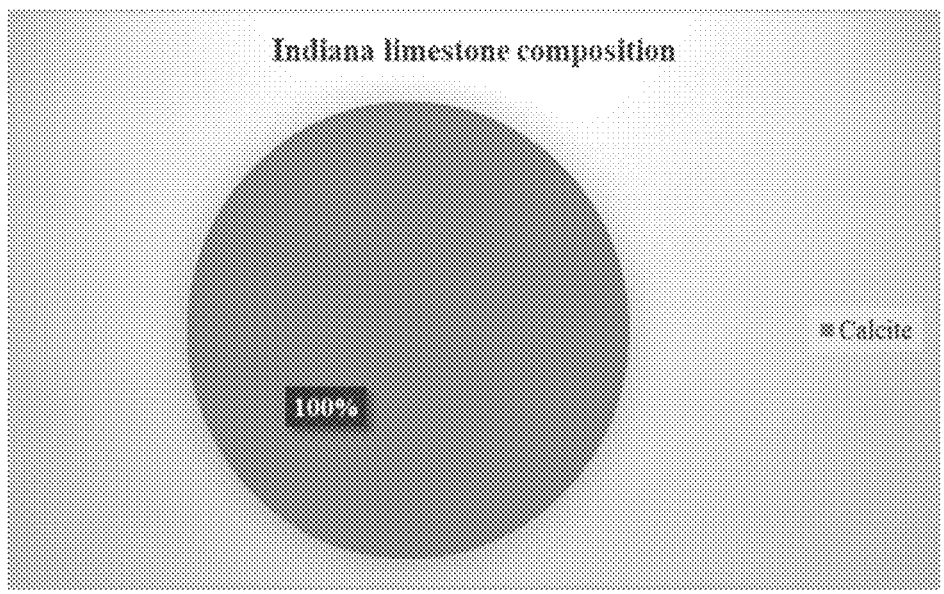
FIG. 15B: Mineral composition of Indiana rock sample.

Two Indiana limestone rock samples named 1H, 2H and two Berea sandstone samples named 1S, 2S were cut form a 12 inches length core. Berea samples were fired at 900° C. for 8 hours to eliminate clay effects such as swelling and then they were used in the study. The samples porosity and permeability were determined using the AP-608 Automated Permeameter-Porosimeter. Table 1 presents the properties of the rock samples. Rock mineral composition was identified using the PAN-alytical Empyrean Multi-Function XRD as shown in FIG. 15.

TABLE 1

Rock sample properties

| Sample | Diameter (cm) | Length (cm) | φ (%) | K (md) |
|--------|---------------|-------------|-------|--------|
| 1H | 3.797 | 4.631 | 18.858 | 281.3108 |
| 2H | 3.804 | 4.907 | 18.539 | 274.2349 |

TABLE 1-continued

Rock sample properties

| Sample | Diameter (cm) | Length (cm) | φ (%) | K (md) |
|---|---|---|---|---|
| 1S | 3.788 | 5.194 | 22.048 | 189.831 |
| 2S | 3.789 | 5.172 | 21.613 | 157.4979 |

EXAMPLE 2: FLUIDS

Figure 16A:
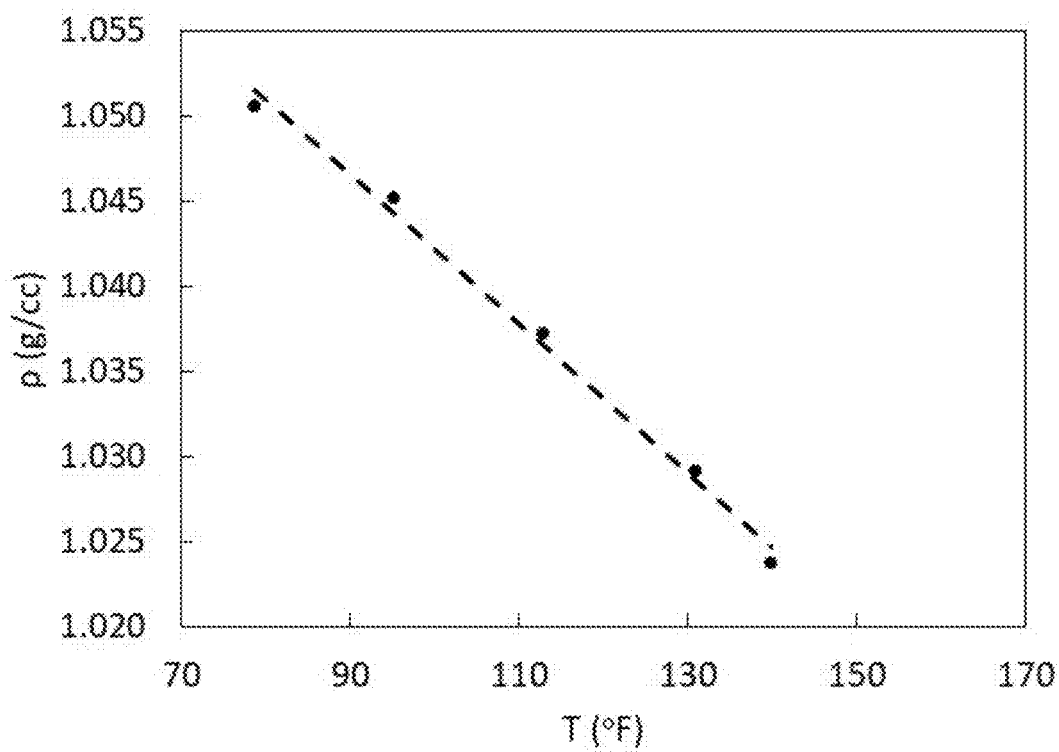
FIG. 16A: Measured density at different temperatures of brine.
Figure 16B:
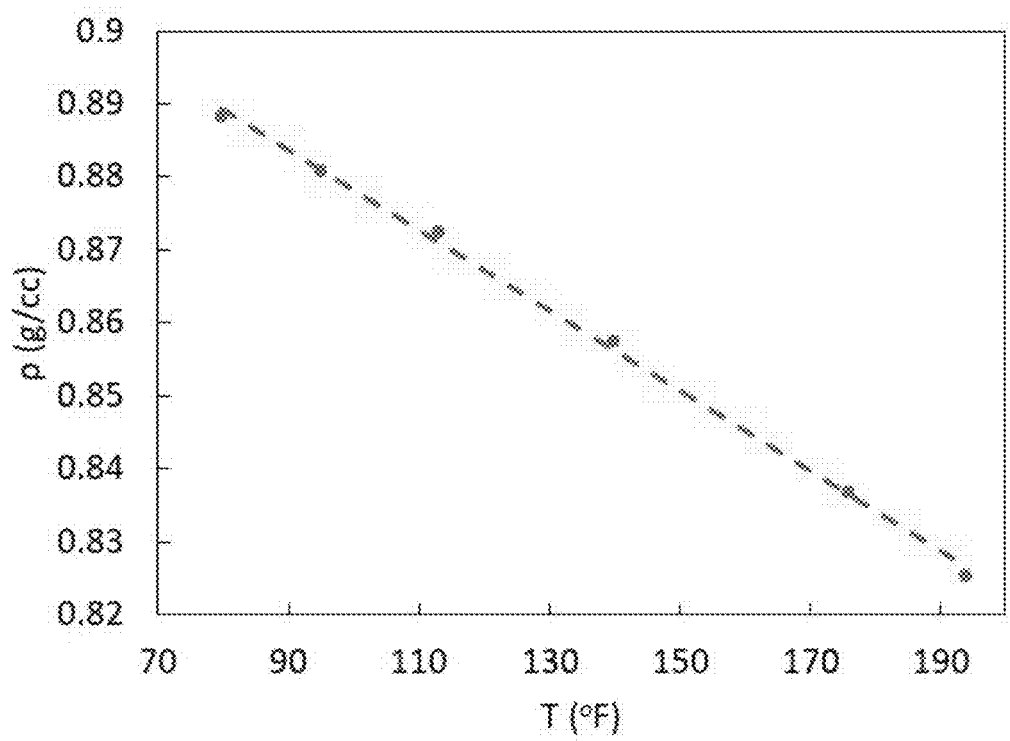
FIG. 16B: Measured density at different temperatures of oil.

8% NaCl brine and Uthmaniyah Crude oil are the fluids used in this study. Brine was prepared by adding NaCl salt to deionized water and mixing for 30 minutes. The crude oil was filtered to remove any solid particles and impurities. The fluid density and viscosity were measured at different temperatures with hydrometer and Oswald viscometer and a temperature-controlled oil bath as presented in FIG. 16, 17 and, respectively asphaltene content of the oil was determined to be 5.045 g/100 ml using ASTM D2007-80 standard procedure.

EXAMPLE 3: NMR

Oxford Instruments' Geospec2-75, operating at 2.2 MHz was used for NMR measurements. The experiments were conducted at room temperatures and pressure. CPMG (Carr-Purcell-Meiboom-Gill) pulse sequence was used for T2 measurements with the signal to noise ratio above 100 and tau time of 0.05 ms.

EXAMPLE 4: FLOW CHART OF THE METHOD AND OVERVIEW OF THE MODEL

FIG. 18 shows the detailed procedure followed, which is evaluating rock wettability from T2 NMR, and validate NMR results with Amott-Harvey wettability index. The wetting phase contacts or coats the pore space surface exhibiting surface relaxation effect which means it shows lower value of T2 compared to its bulk T2 while the non-wetting phase is not affected by surface properties and tends to behave like a bulk fluid. Based on this fact, a wettability index from T2 NMR measurements is provided in Equations 17-19:

$$WI_w = \frac{T_{2,WB} - T_{2,Sor}}{T_{2,WB}} \quad (17)$$

$$WI_o = \frac{T_{2,OB} - T_{2,Swr}}{T_{2,OB}} \quad (18)$$

$$I_{NMR} = WI_w - WI_o \quad (19)$$

Wherein:

$WI_w$, and $WI_o$ are the water, and oil sub-indices, respectively.

$T_{2,WB}$, $T_{2,OB}$, $T_{2,Swr}$, and $T_{2,Sor}$ are the $T_2$ values at predominant peak of bulk water, bulk oil, irreducible water saturation, and residual oil saturation status.

$I_{NMR}$ is the wettability index from NMR.

The model classifies wettability into three types as shown in Table 2 below.

TABLE 2

Developed Wettability Index criteria.

| $I_{NMR}$ | Wettability Type |
|---|---|
| Below −0.4 | Oil-wet |
| −0.4 to 0.4 | Intermediate or mixed wet |
| Above 0.4 | Water wet |

EXAMPLE 5: RELAXATION BEHAVIOR OF BRINE AND OIL IN 1H and 2H SAMPLES (INDIANA LIMESTONE)

Figure 17A:
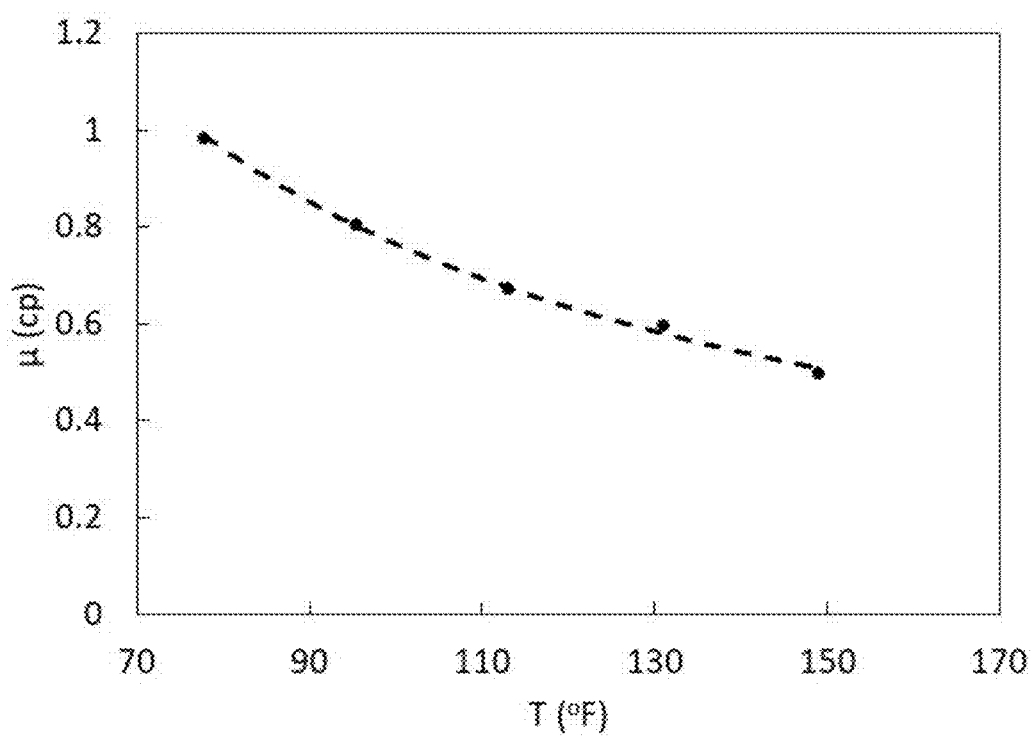
FIG. 17A: Measured viscosity at different temperatures of brine.
Figure 17B:
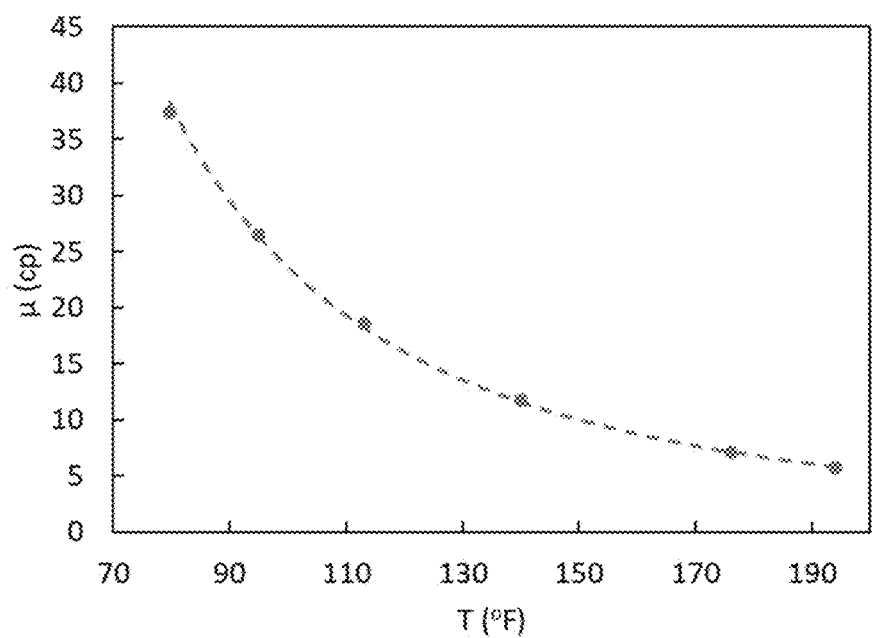
FIG. 17B: Measured viscosity at different temperatures of oil.
Figure 19:
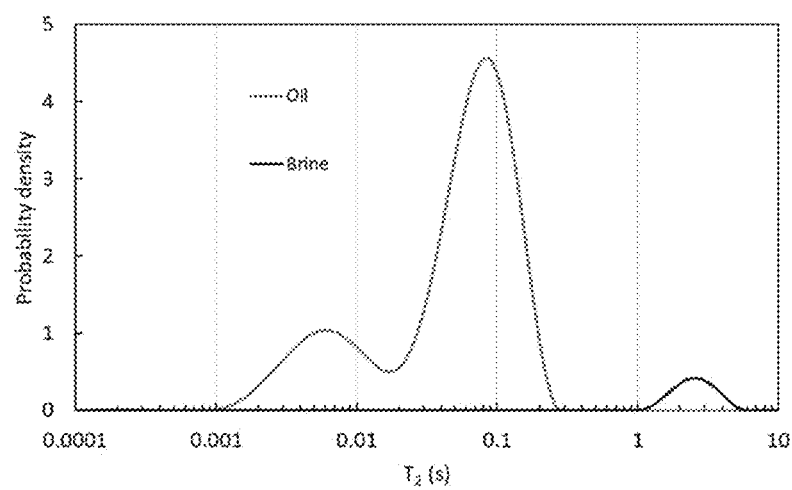
FIG. 19: $T_2$ distribution of Bulk fluids.
Figure 20A:
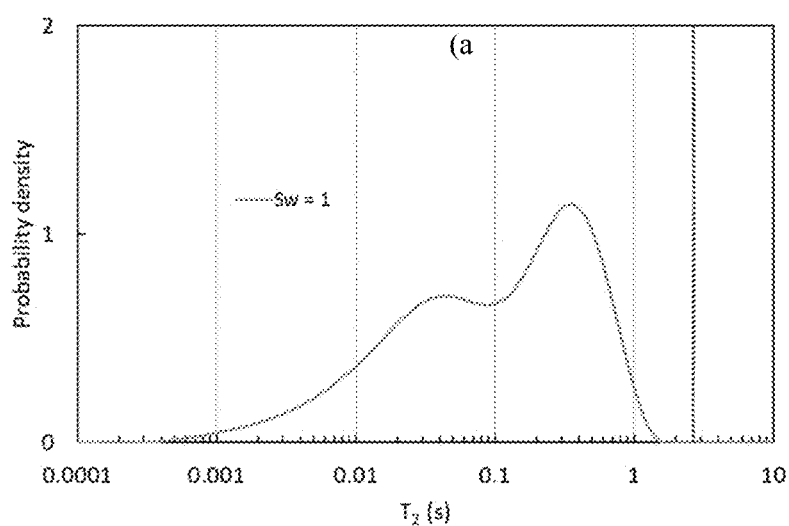
FIG. 20A: $T_2$ distribution of sample 1H at 100% brine saturated after primary drainage. The black dotted line represents the bulk brine $T_2$ while the red dotted line is the bulk oil $T_2$.
Figure 20B:
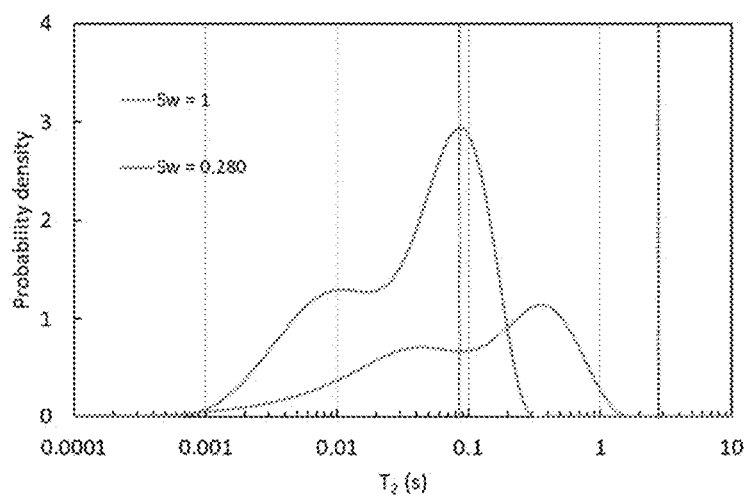
FIG. 20B: $T_2$ distribution of sample 1H at 100% brine saturated after draining. The black dotted line represents the bulk brine $T_2$ while the red dotted line is the bulk oil $T_2$.
Figure 20C:
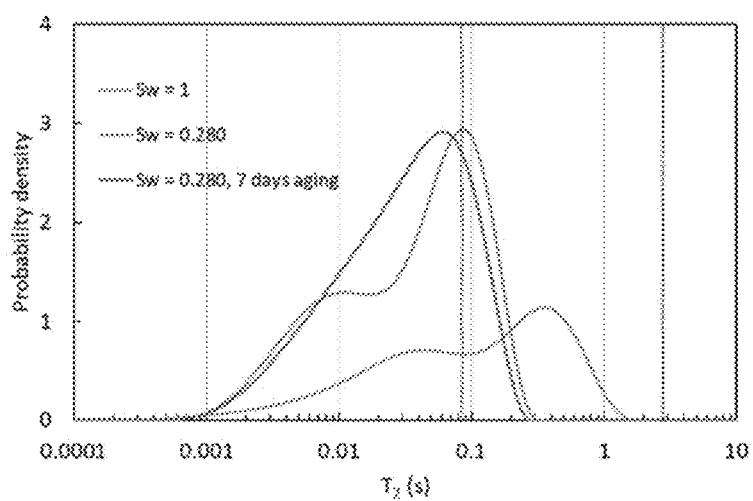
FIG. 20C: $T_2$ distribution of sample 1H at 100% brine after aging. The black dotted line represents the bulk brine $T_2$ while the red dotted line is the bulk oil $T_2$.
Figure 20D:
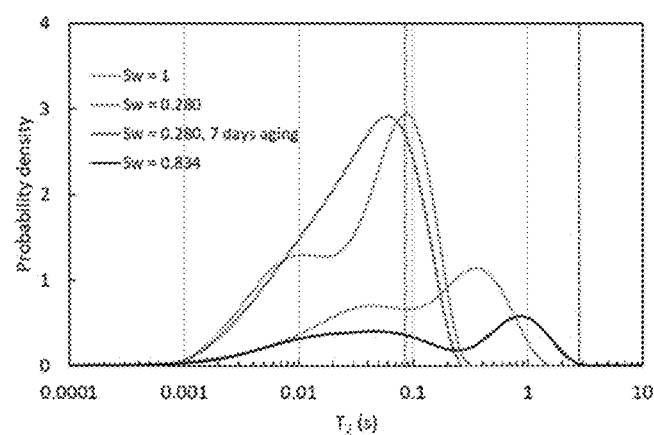
FIG. 20D: $T_2$ distribution of sample 1H at 100% brine after imbibition. The black dotted line represents the bulk brine $T_2$ while the red dotted line is the bulk oil $T_2$.

First, $T_2$ distribution for the bulk fluid was constructed as shown in FIG. 19. There is a clear separation between the oil and water $T_2$ peak in FIG. 19 due to the significant contrast in their viscosity such that the oil is almost 40 times more viscous than the brine as we see in FIG. 17. From FIG. 19, the $T_2$ of brine is 2.78 seconds which is the standard value for water while the oil predominant peak is at $T_2$=0.0864 seconds and the smaller peak is at 0.005572 seconds. The reason that oil has two peaks is attributed to its composition variety from light to heavy components.

The $T_2$ distribution of sample 1H fully saturated with brine is shown in FIG. 20 (*a*). Since brine is the only phase inside the pore space, it exhibits surface relaxation and the predominant peak $T_2$ has been shifted to the left (0.373 s) compared to the bulk fluid $T_2$ represented by the black dotted line (2.78 s). Furthermore, for fully water-saturated sample, $T_2$ predicts the pore size distribution as two connected pore systems (macro and micro). When oil is injected until $S_{wr}$, first—the larger pores were filled by oil and then smaller pores reached the irreducible water saturation. In FIG. 20 (*b*), the predominant peak $T_2$ was shifted to the exact bulk oil $T_2$ represented by the red dotted line (0.0864 s) which indicates that oil is not the wetting phase and does not show any surface relaxation effect. Once the rock was aged for one week, the wettability starts to change in favor of oil-wet conditions and this is clearly indicated by the shift of the predominant peak $T_2$ to 0.0599 s compared to 0.0864 s before aging as shown in FIG. 20 (*c*). However, the shift is not that significant, which indicates that the wettability is closer to intermediate-wet and more likely water-wet and higher aging time is needed to convert the wettability to oil-wet. Next, water was injected until $S_{or}$ and FIG. 20 (*d*) confirms that the wettability is intermediate and more likely water-wet since the predominant peak $T_2$ was shifted to the right 0.93 s compared to the fully water-saturated $T_2$ (0.373 s) which means that the surface relaxation effect on water is reduced due to oil starting also to contact some of the pore surface but it is more likely water wet. This conclusion is confirmed by comparing the $T_2$ after imbibition (0.93 s) to the bulk brine $T_2$ (2.78) and the fully water-saturated $T_2$ (0.373 s). $T_2$ after brine imbibition is still closer to $T_2$ of the fully water-saturated case which is under surface relaxation effect than the bulk brine $T_2$ which is free of surface relaxation effect.

Figure 21:
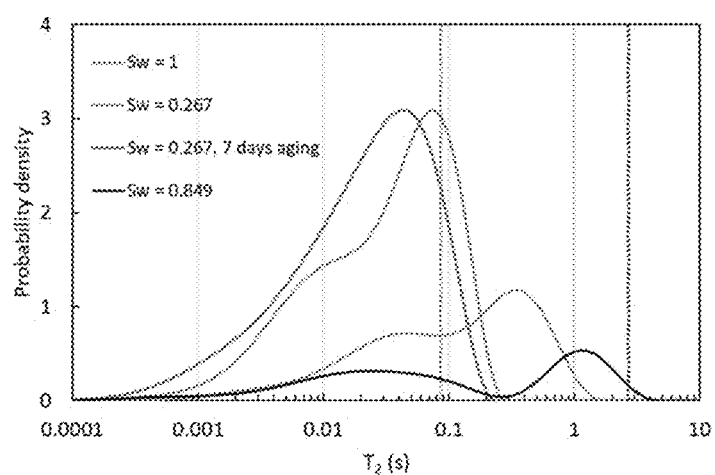
FIG. 21: $T_2$ distribution of sample 2H at different saturations. The black dotted line represents the bulk brine $T_2$ while the red dotted line is the bulk oil predominant $T_2$.

The same behavior was noticed in sample 2H. However, it is more intermediate-wet compared to sample 1H. The conclusion is revealed in FIG. 7 by the shift to the left in T2 after aging and more shift to the right in T2 after imbibition compared to sample 1H. The predominant peak $T_2$ when fully brine saturated is 0.373 s which is the same for sample 1H. When oil was injected until $S_{wr}$, the predominant peak $T_2$ was shifted to 0.072 s which is almost the same as the bulk oil T2 represented by the red dotted line (0.0864 s) which indicates that oil is not the wetting phase. After aging the sample for one week, the wettability was restored closer to the oil-wet conditions and this is indicated by the shift of the predominant peak T2 to 0.0416 s compared to the bulk oil T2 (0.0864 s) as shown in FIG. 21. In addition, the predominant peak $T_2$ after imbibition was shifted to 1.12 s due to the reduction of surface effect on the water phase but it is still intermediate wet since the surface relaxation effect on water is still existing so the $T_2$ is not the same as that of the bulk brine.

Table 3 summarizes the predominant peak $T_2$ values after aging and after imbibition for Indiana limestone samples. The developed wettability index was applied to evaluate wettability quantitatively. Detailed example of the calculation for sample 1H is provided below.

TABLE 3

Summary of the predominant peak T2 values at different saturations for carbonate samples.

| Sample | $T_2$ at $S_{wr}$ | $T_2$ at $S_{or}$ |
|---|---|---|
| 1H | 0.0599 | 0.93 |
| 2H | 0.0416 | 1.12 |

$$WI_w = \frac{T_{2,WB} - T_{2,Sor}}{T_{2,WB}} = \frac{2.78 - 0.93}{2.78} = 0.6655$$

$$WI_o = \frac{T_{2,OB} - T_{2,Swr}}{T_{2,OB}} = \frac{0.0864 - 0.0599}{0.0864} = 0.3067$$

$$I_{NMR} = WI_w - WI_o = 0.6655 - 0.3067 = +0.3588$$

The example of the computation illustrates the pairing of data: water bulk ($T_{2, WB}$) is compared to the signal when water is imbibed or injected ($T_{2, Sor}$). Imbibition is a fast process as compared to complete saturation, and this makes the method rapid. Likewise, oil bulk ($T_{2, OB}$) is compared to the signal when oil is imbibed or injected ($T_{2, Swr}$). This is also a fast process, not requiring careful monitoring of complete displacement. The water term shows a greater range of changes between the bulk and the injected state (2.78 and 0.93 sec) as compared to the respective changes for the oil term (0.0864 and 0.0599 sec), even if the oil term was enhanced by thermal aging. The greater spread between the bulk and injected state for water points to water-wet pore surface. The narrow spread for oil points to oil being in the bulk-like state in the pores, that is non-interacting with the pore surfaces.

Table 4 shows the wettability Index for Indiana limestone samples from the NMR-based model and Amott-Harvey benchmark test. Amott-Harvey wettability index showed a value of +0.32 which indicates an intermediate wettability. The wettability index was determined for 1H as +0.3588 and +0.0786 for 2H which also indicates intermediate wettability condition. There is excellent agreement between the developed model and Amott-Harvey index.

TABLE 4

Wettability Index for carbonate samples from our model and Amott-Harvey model for carbonate samples.

| Sample | $I_{NMR}$ | $I_{Amott-Harvey}$ |
|---|---|---|
| 1H | +0.3588 | +0.32 |
| 2H | +0.07860 | |

EXAMPLE 6: RELAXATION BEHAVIOR OF BRINE AND OIL IN S and 2S SAMPLES (BEREA SANDSTONE)

Figure 22A:
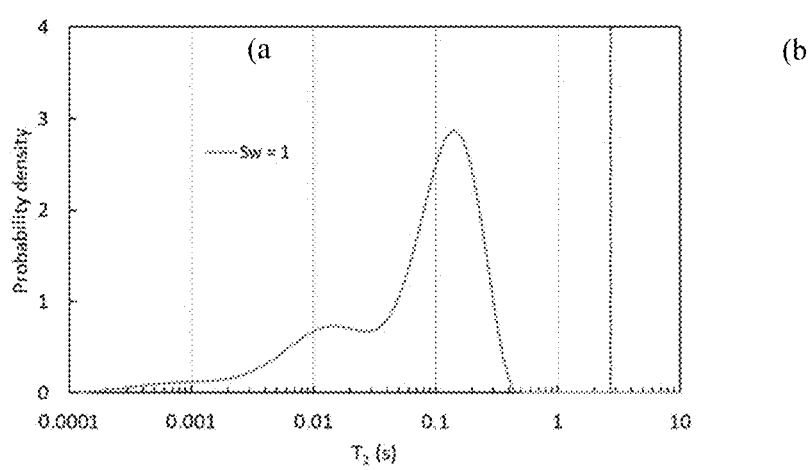
FIG. 22A: $T_2$ distribution of sample 1S at 100% brine. The black dotted line represents the bulk brine $T_2$ while the red dotted line is the bulk oil predominant $T_2$.
Figure 22B:
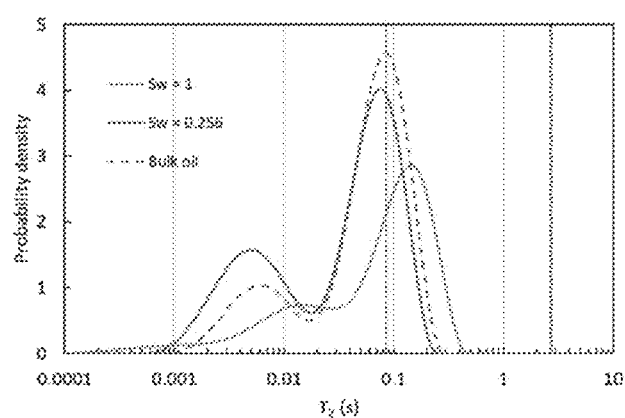
FIG. 22B: $T_2$ distribution of sample 1S at 100% brine after primary drainage. The black dotted line represents the bulk brine $T_2$ while the red dotted line is the bulk oil predominant $T_2$.
Figure 22C:
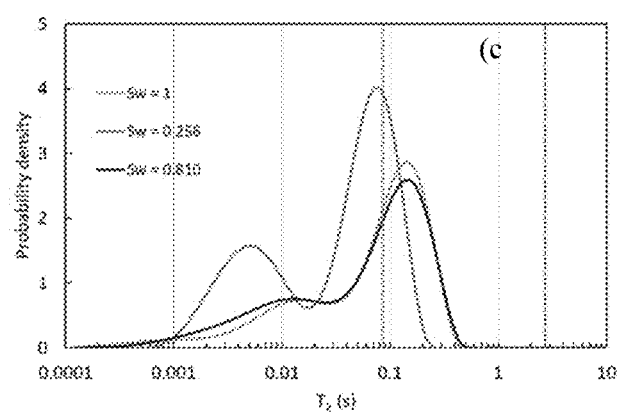
FIG. 22C: $T_2$ distribution of sample 1S at 100% brine saturated after imbibition. The black dotted line represents the bulk brine $T_2$ while the red dotted line is the bulk oil predominant $T_2$.
Figure 23:
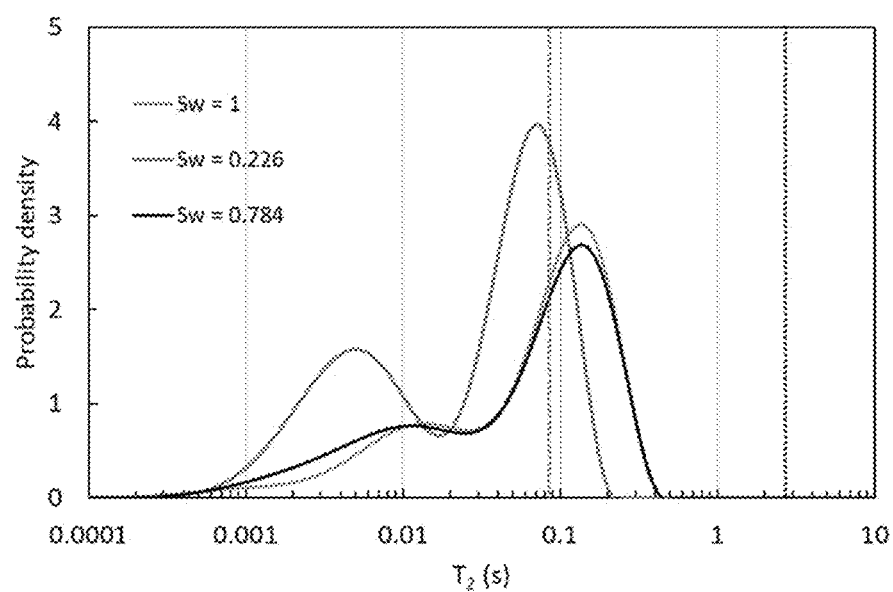
FIG. 23: $T_2$ distribution of sample 2S at different saturations. The black dotted line represents the bulk brine $T_2$ while the red dotted line is the bulk oil predominant $T_2$.

FIG. 22 (*a*) presents the $T_2$ distribution of sample 1S fully saturated with brine. The predominant peak $T_2$ has been shifted to the left (0.149 s) compared to the bulk fluid $T_2$ represented by the black dotted line (2.78 s) which indicates the surface relaxation effect. When oil is injected until $S_{wr}$, FIG. 22 (*b*), the predominant peak $T_2$ was shifted to the to 0.072 s which is almost the same as the bulk oil $T_2$ represented by the red dotted line (0.0864 s) which indicates that oil is not the wetting phase so it does not shows any surface relaxation effect. In addition, the $T_2$ distribution at $S_{wr}$ is almost the same as the bulk oil distribution as shown in FIG. 22 (*b*) which indicates that the sample is strongly water-wet since oil behaves exactly like the bulk fluid although it is inside a pore space. Water was injected until $S_{or}$ and FIG. 22 (*c*) confirms that the rock is strongly water-wet since the predominant peak $T_2$ was shifted to the exact value of $T_2$ when fully brine saturated (0.149 s) and the $T_2$ distribution for the two cases is identical. Sample 2S shows the exact behavior of S quantitatively and qualitatively as shown in FIG. 23.

Like the carbonate samples, the sandstone samples show the same trends. The injected water is strongly shifted (0.149 s) vs. bulk (2.78 s). The injected oil does not much differ from the bulk (0.072 s vs. 0.0864 s). The overall index is dominated by the polar water term.

Table 5 summarizes the predominant peak $T_2$ values after primary drainage and after imbibition for Berea sandstone samples. The developed wettability index was applied to evaluate wettability quantitatively.

TABLE 5

Summary of the predominant peak T2 values at different saturations for sandstone samples.

| Sample | $T_2$ at $S_{wr}$ | $T_2$ at $S_{or}$ |
|---|---|---|
| 1S | 0.072 | 0.149 |
| 2S | 0.072 | 0.149 |

Table 6 shows the wettability Index for Berea sandstone samples. Amott-Harvey wettability index showed a value of +0.79 which indicates a strong water-wet condition. The model determines the wettability index for 1S and 2S as +0.7797 that also indicates a strong water-wet condition. There is excellent agreement between the developed model and Amott-Harvey model.

TABLE 6

Wettability Index for sandstone samples from present disclosure and Amott-Harvey model for sandstone samples.

| Sample | $I_{NMR}$ | $I_{Amott\text{-}Harvey}$ |
|---|---|---|
| 1S | +0.7797 | +0.79 |
| 2S | +0.7797 | |

The invention claimed is:

1. A method of determining wettability of a porous rock, comprising:
 a) providing an oil and a water-based brine fluid comprising one or more isotopes selected from the group consisting of $^1H$, $^2H$, $^{13}C$ and $^{14}C$;
 b) saturating the porous rock with the brine by pressurizing the porous rock with the brine at a pressure sufficient to overcome the capillary pressure in the pores of the porous rock and reach full saturation with the brine ($S_w=1$);
 c) measuring a $T_{2,\,WB}$ signal of the brine fluid by NMR outside the porous rock;
 d) displacing the brine fluid with an oil by pressurizing the porous rock with the oil at a pressure sufficient to overcome the capillary pressure in the pores of the porous rock and reach a final non-decreasing content of the brine fluid, wherein the irreducible amount corresponds to pore wall-bound water;
 e) measuring a $T_{2,sWR}$ signal in the porous rock saturated with the brine fluid;
 f) measuring a $T_{2,OB}$ signal in the oil outside the porous rock by $^1H$ or $^{13}C$ NMR;
 g) saturating the porous rock with the brine until reaching an irreducible oil content;
 h) measuring a $T_{2,SOR}$ signal in the oil saturated porous rock, wherein the $T_{2,\,SOR}$ signal corresponds to the brine fluid coexisting with the residual irreducible oil in the porous rock;
 i) calculating a value $$WI_w = \frac{T_{2,WB} - T_{2,Sor}}{T_{2,WB}}$$

representing the difference between the signal of the brine fluid outside the porous rock and the signal of the brine fluid inside the pores of the porous rock;
 j) calculating the value $$WI_o = \frac{T_{2,OB} - T_{2,Swr}}{T_{2,OB}}$$

representing the difference between the signal of the oil outside the pores of the porous rock and the signal of the oil inside the pores of the porous rock;
 k) calculating the wettability index of the porous rock $I_{NMR}=WI_w-WI_o$.

2. The method of claim 1, further comprising, between (d) and (e), exposing the porous rock to a reduced pressure and an elevated temperature until the brine fluid evaporates to the level of <1% of a content in (d) to increase the oil-wettability of the porous rock.

3. The method of claim 1, wherein the NMR measurement includes a $T_2$ estimated by Carr-Purcell-Meiboom-Gill (CPMG) sequence.

4. The method of claim 1, wherein the NMR is measured on a plurality of porous rock samples obtained at different depths of a geological formation.

5. The method of claim 1, further comprising one or more of:
 measuring a relative displacement of the oil in the porous rock in response to the increase in saturating brine pressure;
 measuring a relative change in conductance or resistivity of the oil in the porous rock in response to the increase in saturating brine pressure;
 measuring a relative redistribution of the oil and the brine fluid in the pores of the porous rock at different diameter categories of the pores.

6. The method of claim 1, further comprising:
 setting a bench for a wettability-prediction.

7. The method of claim 1, further comprising:
 comparing at least two geological formations with a down hole NMR loggin tool and/or a downhole resistivity logging tool.

8. The method of claim 1, further comprising:
 modeling a wettability index W according to the expression:

$$A_1 \times [\tau_{NMR}^{B1}] \times [R^{B2}] \times [\Phi_{NMR}^{B3}] \times (\tau_{NMRZ})^{B4}/(\tau_{NMRXY})^{B4} \times S_w^{B5} \times S_{wir}^{B6} \times (\Delta H/H)^{B7} \times [D]^{B8} = W$$

Where:
 W—is dimensionless wettability index in the range (−1, 1),
 $A_1$—is an empirical proportionality factor,
 $[\tau_{NMR}^{B1}]$—is a diffusional tortuosity determined by NMR,
 $[R^{B2}]$—is a relative resistivity at a brine fluid saturation level,
 $[\Phi_{NMR}^{B3}]$—is an overall porosity determined by NMR,
 $[(\tau_{NMRZ})^{B4}/(\tau_{NMRXY})^{B4}]$—is a ratio of diffusional tortuosity in the direction Z to one measured in the plane XY,
 $S_w^{B5}$—is a water saturation fraction,
 $S_{wir}^{B6}$—is an irreducible water content,
 $(\Delta H/H)^{B7}$—is a fraction of the oil expelled from the porous rock at $S_w$,
 $(D)^{B8}$—is a weight-averaged diameter of the pores;
 wherein the values are represent water flooding conditions in an innermost 5 mm layer of a borehole wall in the geological formation.

* * * * *